(12) United States Patent
Chen et al.

(10) Patent No.: US 9,124,406 B2
(45) Date of Patent: Sep. 1, 2015

(54) FALLBACK OPERATION FOR CROSS-CARRIER SIGNALING IN MULTI-CARRIER OPERATION

(75) Inventors: Wanshi Chen, San Diego, CA (US); Jelena M. Damnjanovic, Del Mar, CA (US); Peter Gaal, San Diego, CA (US); Juan Montojo, San Diego, CA (US); Aleksandar Damnjanovic, Del Mar, CA (US)

(73) Assignee: QUALCOMM Incorporated, San Diego, CA (US)

( * ) Notice: Subject to any disclaimer, the term of this patent is extended or adjusted under 35 U.S.C. 154(b) by 958 days.

(21) Appl. No.: 12/976,818

(22) Filed: Dec. 22, 2010

(65) Prior Publication Data

US 2012/0009923 A1 Jan. 12, 2012

Related U.S. Application Data

(60) Provisional application No. 61/290,724, filed on Dec. 29, 2009, provisional application No. 61/313,647, filed on Mar. 12, 2010.

(51) Int. Cl.
*H04W 4/00* (2009.01)
*H04B 7/216* (2006.01)
*H04L 5/00* (2006.01)

(52) U.S. Cl.
CPC ............ *H04L 5/0091* (2013.01); *H04L 5/0053* (2013.01)

(58) Field of Classification Search
CPC ............................ H04I 5/0091; H04I 5/0053
See application file for complete search history.

(56) References Cited

U.S. PATENT DOCUMENTS

| | | | |
|---|---|---|---|
| 7,733,827 B2* | 6/2010 | Kim et al. | 370/328 |
| 8,223,712 B2* | 7/2012 | Kim et al. | 370/329 |
| 8,295,868 B2* | 10/2012 | Zhang et al. | 455/515 |
| 2004/0038684 A1 | 2/2004 | Sugaya | |
| 2005/0053036 A1 | 3/2005 | Takeda | |

(Continued)

FOREIGN PATENT DOCUMENTS

| | | |
|---|---|---|
| CN | 101465720 A | 6/2009 |
| CN | 10150549 A | 8/2009 |

(Continued)

OTHER PUBLICATIONS

Catt: "Carrier indicator for LTE-A", 3GPP Draft; R1-094538, 3rd Generation Partnership Project (3GPP), Mobile Competence Centre ; 650, Route Des Lucioles ; F-06921 Sophia-Antipolis Cedex ; France, No. Jeju; Nov. 9, 2009, XP050388953.

(Continued)

*Primary Examiner* — Steven H Nguyen
(74) *Attorney, Agent, or Firm* — Steven A. Raney

(57) ABSTRACT

Techniques for supporting fallback operation in a multi-carrier communication system are described. In one aspect, a UE may determine at least one first downlink control information (DCI) format to monitor on a first carrier. The UE may monitor for the first DCI format(s) on the first carrier to detect DCI sent to the UE. The UE may receive a reconfiguration message related to communication on a plurality of carriers by the UE with cross-carrier signaling, and may determine at least one second DCI format to monitor on the first carrier based on the reconfiguration message. The UE may monitor for the first DCI format(s) and the second DCI format(s) on the first carrier after receiving the reconfiguration message.

49 Claims, 11 Drawing Sheets

(56) References Cited

U.S. PATENT DOCUMENTS

| | | | |
|---|---|---|---|
| 2005/0096076 | A1 | 5/2005 | Gu et al. |
| 2005/0176437 | A1 | 8/2005 | Mir |
| 2008/0214224 | A1 | 9/2008 | Ostman et al. |
| 2009/0088148 | A1 | 4/2009 | Chung et al. |
| 2010/0046412 | A1 | 2/2010 | Varadarajan et al. |
| 2010/0215011 | A1* | 8/2010 | Pan et al. ............... 370/329 |
| 2010/0227638 | A1 | 9/2010 | Park et al. |
| 2010/0254329 | A1* | 10/2010 | Pan et al. ............... 370/329 |
| 2010/0273515 | A1 | 10/2010 | Fabien et al. |
| 2010/0279628 | A1 | 11/2010 | Love et al. |
| 2010/0323744 | A1 | 12/2010 | Kim et al. |
| 2011/0014922 | A1 | 1/2011 | Jen |
| 2011/0021154 | A1* | 1/2011 | Marinier et al. ........ 455/67.11 |
| 2011/0021228 | A1 | 1/2011 | Kim et al. |
| 2011/0038331 | A1* | 2/2011 | Chmiel et al. ............ 370/329 |
| 2011/0044222 | A1 | 2/2011 | Gerstenberger et al. |
| 2011/0044259 | A1 | 2/2011 | Nimbalker et al. |
| 2011/0051681 | A1 | 3/2011 | Ahn et al. |
| 2011/0064042 | A1 | 3/2011 | Kim et al. |
| 2011/0070845 | A1 | 3/2011 | Chen et al. |
| 2011/0081936 | A1 | 4/2011 | Haim et al. |
| 2011/0081939 | A1 | 4/2011 | Damnjanovic et al. |
| 2011/0081940 | A1 | 4/2011 | Gerstenberger et al. |
| 2011/0134774 | A1* | 6/2011 | Pelletier et al. ............ 370/252 |
| 2011/0134877 | A1 | 6/2011 | Noh et al. |
| 2011/0250918 | A1 | 10/2011 | Jen |
| 2011/0299489 | A1* | 12/2011 | Kim et al. ............... 370/329 |
| 2011/0319121 | A1 | 12/2011 | Jen |
| 2012/0046064 | A1 | 2/2012 | Baldemair et al. |
| 2012/0127946 | A1 | 5/2012 | Nishio et al. |
| 2012/0208583 | A1* | 8/2012 | Chung et al. ............ 455/509 |
| 2013/0153298 | A1* | 6/2013 | Pietraski et al. ............ 175/45 |

FOREIGN PATENT DOCUMENTS

| | | |
|---|---|---|
| CN | 10199861 A | 3/2011 |
| EP | 1895697 A1 | 3/2008 |
| JP | 2003152671 A | 5/2003 |
| JP | 2005045504 A | 2/2005 |
| RU | 2313912 C2 | 12/2007 |
| RU | 2319307 C2 | 3/2008 |
| WO | WO-2008083804 A2 | 7/2008 |
| WO | WO-2008157797 | 12/2008 |
| WO | WO-2009021012 A2 | 2/2009 |
| WO | WO-2009041779 A1 | 4/2009 |
| WO | WO-2009048404 A1 | 4/2009 |
| WO | WO-2009057283 A1 | 5/2009 |
| WO | WO-2009099271 A1 | 8/2009 |
| WO | WO-2011021379 A1 | 2/2011 |

OTHER PUBLICATIONS

International Search Report and Written Opinion—PCT/US2010/062053—ISA/EPO—Jan. 12, 2012.
MCC Support: "Draft Report of 3GPP TSG RAN WG1 #59 v0.2.0 (Jeju, South Korea, Nov. 9-13, 2009) ", 3GPP Draft; Draft REPORTWG1#59_V020, 3rd Generation Partnership Project (3GPP), Mobile Competence Centre ; 650, Route Des Lucioles ; F-06921 Sophia-Antipolis Cedex ; France, vol. RAN WG1, No. Valencia, Spain; Jan. 18, 2010, Nov. 19, 2009, XP050448942, p. 22-p. 38.
Panasonic: "Discussion on PDCCH with carrier indicator", 3GPP Draft; R1-094496, 3rd Generation Partnership Project (3GPP), Mobile Competence Centre, Nov. 9, 2009, pp. 1-3, XP050388917, France [retrieved on Nov. 2, 2009].
ZTE: "PDCCH designing issues for LTE-A", 3GPP Draft; R1-094736 PDCCH Designing Issues for LTE-A, 3rd Generation Partnership Project (3GPP), Mobile Competence Centre ; 650, Route Des Lucioles ; F-06921 Sophia-Antipolis Cedex ; France, No. Jeju; Nov. 9, 2009, XP050389133.
(3GPP), Mobile Competence Centre; 650, Route des Lucioles; F-06921 Sophia-Antipolis Cedex; France, no. Jeju; 20091109 Nov. 9, 2009, XP050389133.
3GPP: "3rd Generation Partnership Project, Technical Specification Group Radio Access Network, Evolved Universal Terrestrial Radio Access (E-UTRA), Physical layer procedures (Release 8)" 3GPP Draft, DRAFT36213-880, 3rd Generation Partnership Project (3GPP), Mobile Competence Centre , 650, Route Des Lucioles , F06921 Sophia-Antipolis Cedex , France, Sep. 1, 2009, XP050388082.
3GPP TSG RAN WG #58bis, Qualcomm Europe "UL Power Control for Multicarrier operation", R1-094209, Oct. 16, 2009.
3rd Generation Partnership Project; Technical Specification Group Raciio Access Network; Radio Resource Control (RRC); Protocol Specification (Release 8) , 3GPP Standard; 3GPP TS 25.331, 3rd Generation Partnership Project (3GPP), Mobile Competence Centre ; 650, Route Des Lucioles ; F-06921 Sophia-Antipolis Cedex ; France, No. V8.7.0, Jun. 1, 2009, pp. 1-1685, XP050368027, p. 575-pp. 579, 777 pp. 839-841.
3rd Generation Partnership Project; Technical Specification Group Radio Access Network; Evolved Universal Terrestrial Radio Access (E-UTRA); Physical layer procedures (Release 8) 3GPP Standard; 3GPP TS 36.213, 3rd Generation Partnership Project (3GPP), Mobile Competence Centre; 650, Route Des Lucioles; F-06921 Sophiaantipolis Cedex ; France, No. V8.7.0, May 1, 2009, pp. 1-81, XP050377562 the whole document.
Ericsson, "Carrier aggregation in LTE-Advanced", 3GPP Draft, R1-082468, 3rd Generation Partnership Project (3GPP), Mobile Competence Centre, 650, Route Des Lucioles, F-06921 Sophia-Antipolis Cedex, France, vol. RAN WGI, No. Warsaw, Poland, Jun. 30, 2008, pp. 1-6, XP050110739.
Qualcomm Europe: "Interpreting the Carrier Indicator Field" 3GPP Draft, R1-094206 Interpretation of the Carrier Indicator Field, 3rd Generation Partnership Project (3GPP), Mobile Competence Centre, 650, Route Des Lucioles, F-06921 Sophia-Antipolis Cedex, France, No. Miyazaki, Oct. 12, 2009, XP050388676.
Qualcomm Europe: "UE Transmitter characteristics impact due to DC-HSUPA", 3GPP Draft; R4-091680_UE_TX_DC_HSUPA, 3rd Generation Partnership Project (3GPP), Mobile Competence Centre; 650, Route Des Lucioles; F-06921 Sophia-Antipolis Cedex; France, No. San Francisco; Apr. 27, 2009, XP050342428.
Research in Motion et al.,"Carrier Indication for Carrier Aggregation" 3GPP Draft, R1-092417 (Rim-Carrier Indication for CA), 3rd Generation Partnership Project (3GPP), Mobile Competence Centre, 650, Route Des Lucioles, F-06921 Sophia-Antipolis Cedex, France, No. Los Angeles, USA, Jun. 24, 2009, pp. 1-2, XP050350931.
Taiwan Search Report—TW099146688—TIPO—Apr. 9, 2014.
ZTE: "Considerations on Carrier Indicator" 3GPP Draft, R1-093207 Considerations on Carrier Indicator, 3RD Generation Partnership Project (3GPP), Mobile Competence Centre , 650, Route Des Lucioles , F-06921 Sophia-Antipolis Cedex, France, No. Shenzhen, China, Aug. 19, 2009, pp. 1-3, XP050351560.
ZTE: "Primary and Secondary PDCCH Design for LTE-A", 3GPP Draft; R1-091707, 3rd Generation Partnership Project (3GPP), Mobile Competence Centre, May 8, 2009, pp. 1-12.
3GPP TSG RAN WG1 Meeting #58, R1-093282, ASUSTeK: "Multi-Carrier UL power control for LTE-A", Aug. 28, 2009, pp. 1-40.

* cited by examiner

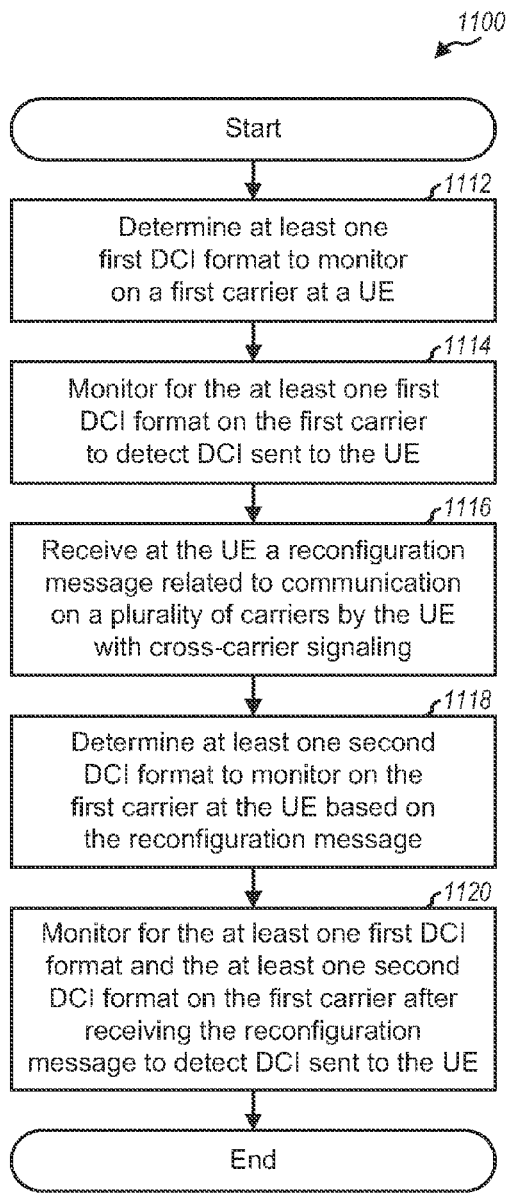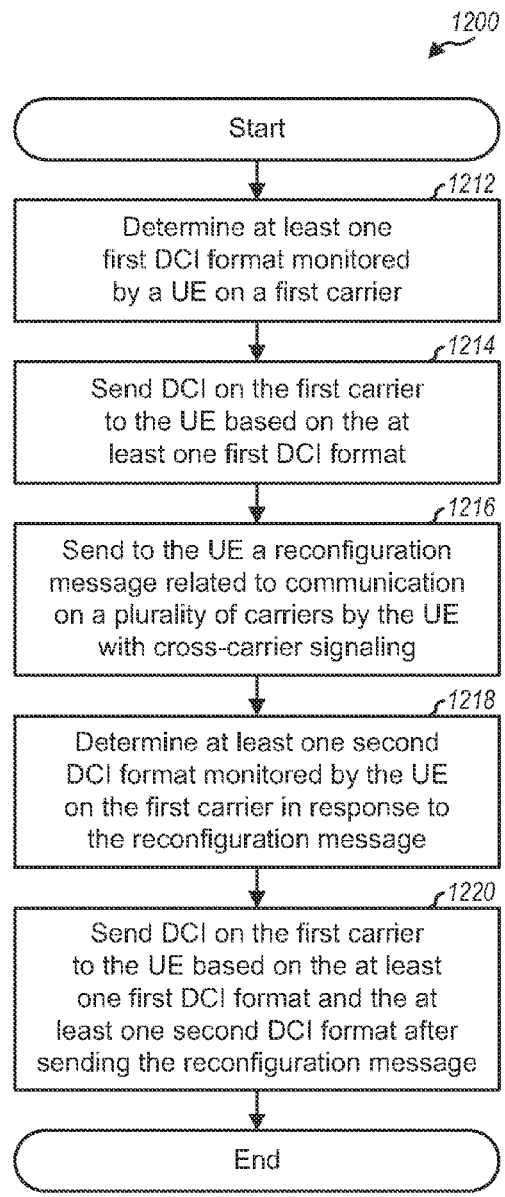
FIG. 11
FIG. 12

FALLBACK OPERATION FOR CROSS-CARRIER SIGNALING IN MULTI-CARRIER OPERATION

The present application claims the benefit of U.S. Provisional Application No. 61/290,724, entitled "FALLBACK OPERATION IN CROSS-CARRIER SIGNALING BASED MULTICARRIER OPERATION IN LTE-A," filed Dec. 29, 2009, and U.S. Provisional Application No. 61/313,647, entitled "METHOD AND APPARATUS THAT FACILITATES CROSS-CARRIER SIGNALING BASED MULTI-CARRIER OPERATION IN LONG TERM EVOLUTION SYSTEMS," filed Mar. 12, 2010, both of which are assigned to the assignee hereof and incorporated herein by reference.

BACKGROUND

I. Field

The present disclosure relates generally to communication, and more specifically to techniques for supporting communication in a wireless communication system.

II. Background

Wireless communication systems are widely deployed to provide various communication content such as voice, video, packet data, messaging, broadcast, etc. These wireless systems may be multiple-access systems capable of supporting multiple users by sharing the available system resources. Examples of such multiple-access systems include Code Division Multiple Access (CDMA) systems, Time Division Multiple Access (TDMA) systems, Frequency Division Multiple Access (FDMA) systems, Orthogonal FDMA (OFDMA) systems, and Single-Carrier FDMA (SC-FDMA) systems.

A wireless communication system may include a number of base stations that can support communication for a number of user equipments (UEs). A UE may communicate with a base station via the downlink and uplink. The downlink (or forward link) refers to the communication link from the base station to the UE, and the uplink (or reverse link) refers to the communication link from the UE to the base station.

SUMMARY

Techniques for supporting fallback operation in a multi-carrier communication system are disclosed. A UE may operate on multiple carriers for multi-carrier operation. Cross-carrier signaling may be used for multi-carrier operation and may entail sending control information on one carrier to support data transmission on another carrier. Fallback operation refers to the ability to reliably send control information to the UE even when an operating mode of the UE (e.g., whether the UE is operating on a single carrier or multiple carriers) is unknown.

In one design, a UE may determine at least one first downlink control information (DCI) format to monitor on a first carrier. The UE may monitor for the at least one first DCI format on the first carrier to detect DCI sent to the UE. The UE may receive a reconfiguration message related to communication on a plurality of carriers by the UE with cross-carrier signaling. The UE may determine at least one second DCI format to monitor on the first carrier based on the reconfiguration message. The UE may monitor for the at least one first DCI format and the at least one second DCI format on the first carrier after receiving the reconfiguration message to detect DCI sent to the UE. Fallback operation is supported by having the UE monitor for the at least one first DCI format before and after receiving the reconfiguration message. DCI may be reliably sent to the UE based on the at least one first DCI format even when there is uncertainty regarding an operating mode of the UE.

In one design, a base station may determine the at least one first DCI format monitored by the UE on the first carrier. The base station may send DCI on the first carrier to the UE based on the at least one first DCI format. The base station may send the reconfiguration message related to communication on the plurality of carriers by the UE with cross-carrier signaling. The base station may determine the at least one second DCI format monitored by the UE on the first carrier in response to the reconfiguration message. The base station may send DCI on the first carrier to the UE based on the at least one first DCI format and the at least one second DCI format after sending the reconfiguration message.

In one design, each second DCI format may comprise a corresponding first DCI format and at least one additional field to support cross-carrier signaling. The at least one additional field may include a cross-carrier indicator field (CIF), as described below. The at least one first DCI format may have a first size, and the at least one second DCI format may have a second size that is different from the first size.

Fallback operation may be restricted in various manners in order to limit the number of blind decodes performed by the UE to detect DCI sent to the UE. In one design, fallback operation may be supported for certain DCI formats but not other DCI formats. In another design, fallback operation may be supported for one or more carriers but not other carriers. In yet another design, fallback operation may be supported for one or more search spaces of the UE but not other search spaces. In yet another design, fallback operation may be supported for certain Physical Downlink Control Channel (PDCCH) candidates for the UE but not other PDCCH candidates. Fallback operation may also be restricted in other manners. Various aspects and features of the disclosure are described in further detail below.

BRIEF DESCRIPTION OF THE DRAWINGS

FIG. 11 shows an exemplary process for receiving DCI by a UE.

FIG. 12 shows an exemplary process for sending DCI by a base station.

DETAILED DESCRIPTION

The techniques described herein may be used for various wireless communication systems such as CDMA, TDMA, FDMA, OFDMA, SC-FDMA and other systems. The terms "system" and "network" are often used interchangeably. A CDMA system may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA system may implement a radio technology such as Global System for Mobile Communications (GSM). An OFDMA system may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM®, etc. UTRA and E-UTRA are part of Universal Mobile Telecommunication System (UMTS). 3GPP Long Term Evolution (LTE) and LTE-Advanced (LTE-A) are new releases of UMTS that use E-UTRA, which employs OFDMA on the downlink and SC-FDMA on the uplink. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the systems and radio technologies mentioned above as well as other systems and radio technologies. For clarity, certain aspects of the techniques are described below for LTE, and LTE terminology is used in much of the description below.

Figure 1:
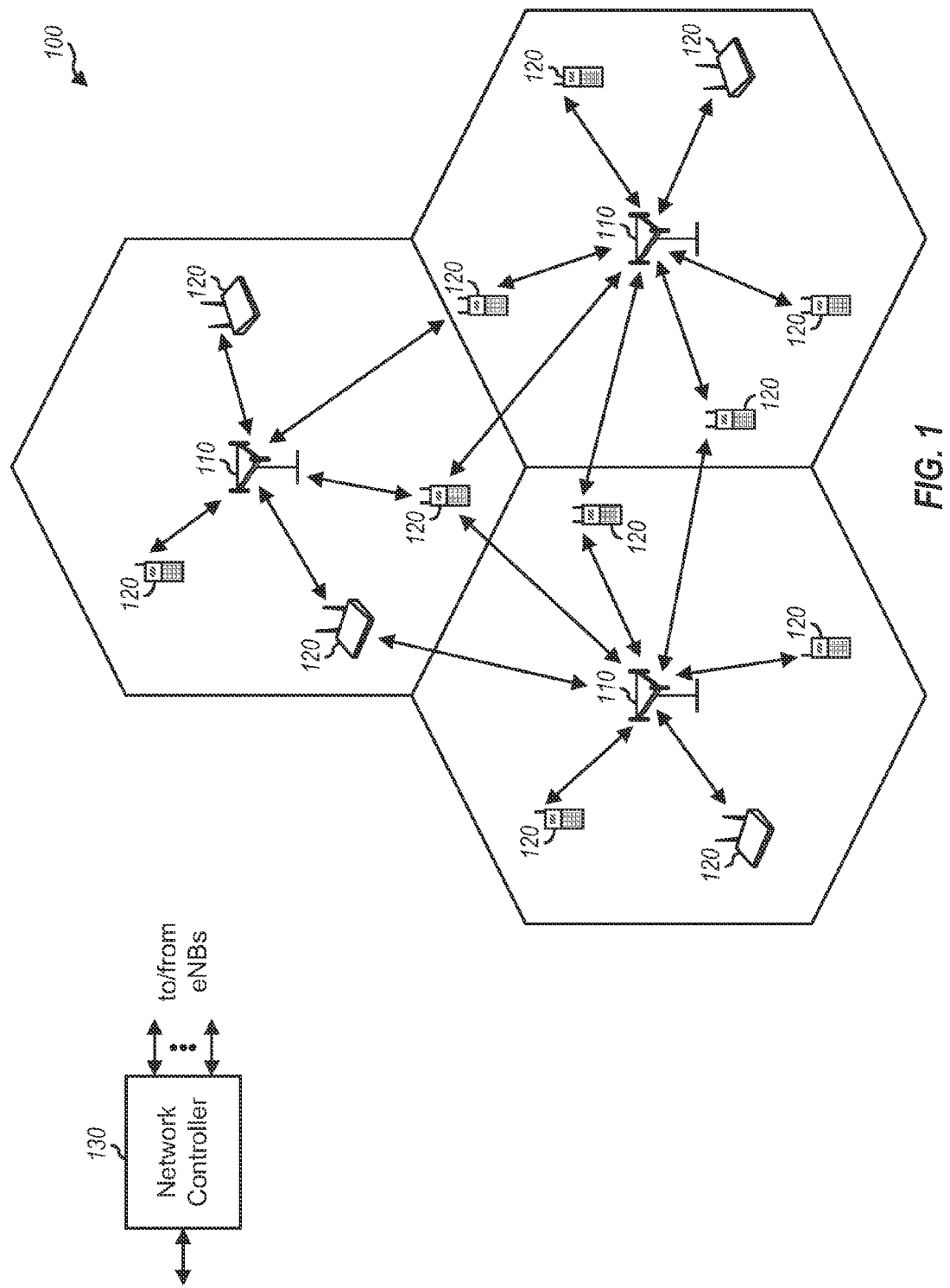
FIG. 1 shows an exemplary wireless communication system.

FIG. 1 shows a wireless communication system 100, which may be an LTE system or some other system. System 100 may include a number of evolved Node Bs (eNBs) 110 and other network entities. An eNB may be an entity that communicates with the UEs and may also be referred to as a base station, a Node B, an access point, etc. Each eNB 110 may provide communication coverage for a particular geographic area and may support communication for the UEs located within the coverage area. To improve system capacity, the overall coverage area of an eNB may be partitioned into multiple (e.g., three) smaller areas. Each smaller area may be served by a respective eNB subsystem. In 3GPP, the term "cell" can refer to the smallest coverage area of an eNB and/or an eNB subsystem serving this coverage area.

A network controller 130 may couple to a set of eNBs and may provide coordination and control for these eNBs. Network controller 130 may comprise a Mobility Management Entity (MME) and/or some other network entity.

UEs 120 may be dispersed throughout the system, and each UE may be stationary or mobile. A UE may also be referred to as a mobile station, a terminal, an access terminal, a subscriber unit, a station, etc. A UE may be a cellular phone, a personal digital assistant (PDA), a wireless modem, a wireless communication device, a handheld device, a laptop computer, a cordless phone, a wireless local loop (WLL) station, a smart phone, a netbook, a smartbook, etc.

Figure 2:
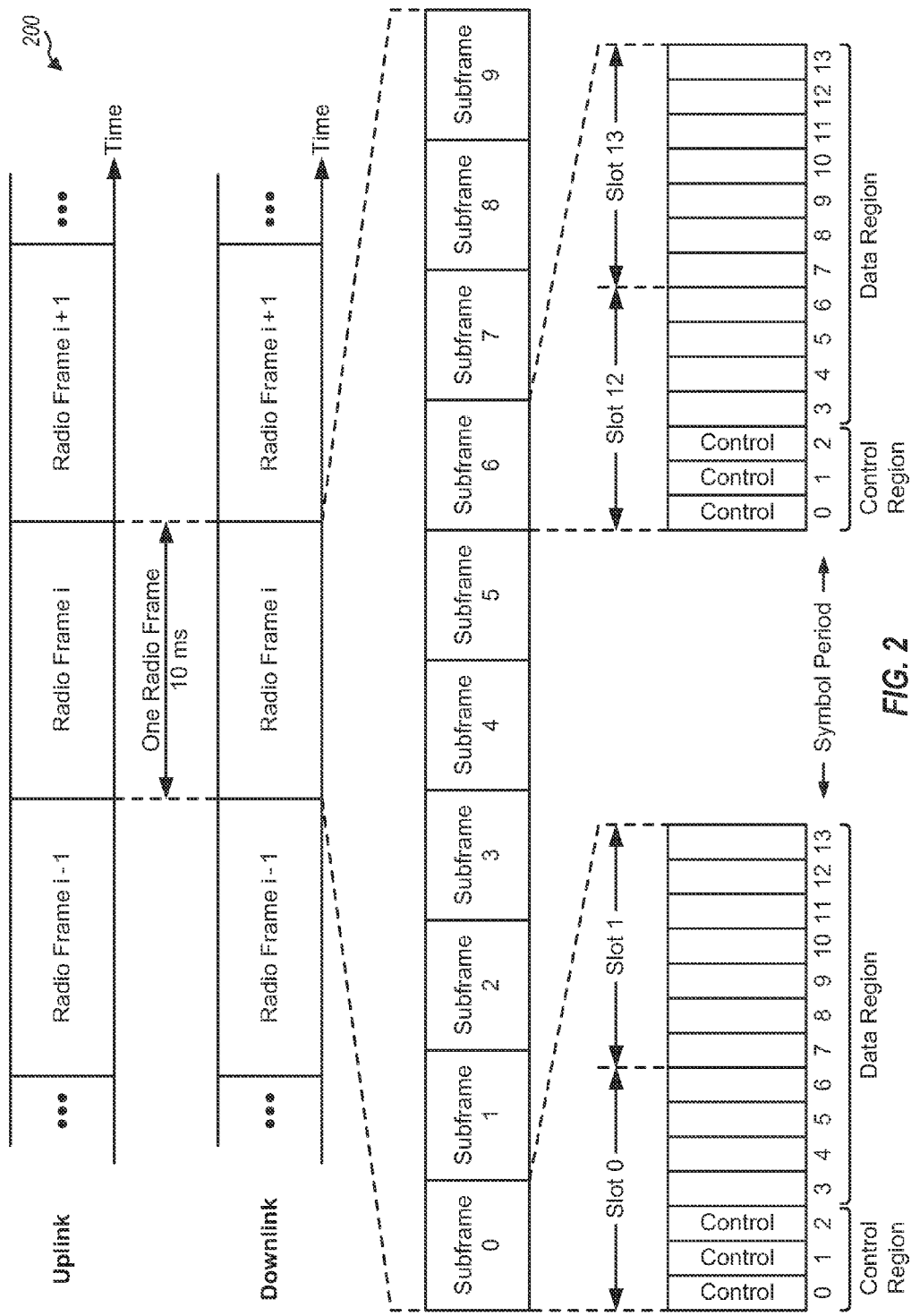
FIG. 2 shows an exemplary frame structure.

FIG. 2 shows a frame structure 200 for frequency division duplexing (FDD) in LTE. For FDD, the downlink and uplink may be allocated separate frequency channels. The transmission timeline for each of the downlink and uplink may be partitioned into units of radio frames. Each radio frame may have a predetermined duration (e.g., 10 milliseconds (ms)) and may be partitioned into 10 subframes with indices of 0 through 9. Each subframe may include two slots. Each radio frame may thus include 20 slots with indices of 0 through 19. Each slot may include seven symbol periods for a normal cyclic prefix (as shown in FIG. 2) or six symbol periods for an extended cyclic prefix.

Each subframe for the downlink may include a control region and a data region, which may be time division multiplexed (TDM) as shown in FIG. 2. The control region may include the first M symbol periods of the subframe, where M may be equal to 1, 2, 3 or 4 and may change from subframe to subframe. The control region may carry control information for UEs. The data region may include the remaining symbol periods of the subframe and may carry data and/or other information for UEs.

Each subframe for the uplink may include a control region and a data region, which may be frequency division multiplexed (FDM) (not shown). The control region may be formed at the two edges of the system bandwidth and may have a configurable size, which may be selected based on the amount of control information to send on the uplink by the UEs. The data region may include the remaining frequency not covered by the control region.

An eNB may send downlink control information (DCI) on a Physical Downlink Control Channel (PDCCH) in the control region of a subframe for the downlink (or a downlink subframe). The DCI may comprise downlink (DL) grants, uplink (UL) grants, power control information, etc. The eNB may send data on a Physical Downlink Shared Channel (PDSCH) in the data region of the downlink subframe. The PDSCH may carry data for UEs scheduled for data transmission on the downlink and/or other information.

A UE may send uplink control information (UCI) on a Physical Uplink Control Channel (PUCCH) on assigned resource blocks in the control region of a subframe for the uplink (or an uplink subframe). The UCI may include acknowledgement (ACK) information for data transmission sent on the downlink, channel quality indicator (CQI) information, scheduling request, etc. The UE may send only data, or both data and UCI, on a Physical Uplink Shared Channel (PUSCH) on assigned resource blocks in the data region of the uplink subframe. An uplink transmission may span both slots of a subframe and may hop across frequency.

The system may support operation on a single carrier or multiple carriers for each of the downlink and uplink. A carrier may refer to a range of frequencies used for communication and may be associated with certain characteristics. For example, each carrier may be assignable to one or more UEs for communication. A carrier may also be referred to as a component carrier, a cell, a frequency, an RF channel, etc. Operation on multiple carriers may also be referred to as carrier aggregation or multi-carrier operation. A UE may operate on one or more carriers for the downlink (or downlink carriers) and one or more carriers for the uplink (or uplink carriers) for communication with an eNB. The eNB may send data and DCI on the one or more downlink carriers to the UE. The UE may send data and UCI on the one or more uplink carriers to the eNB.

Figure 3A:
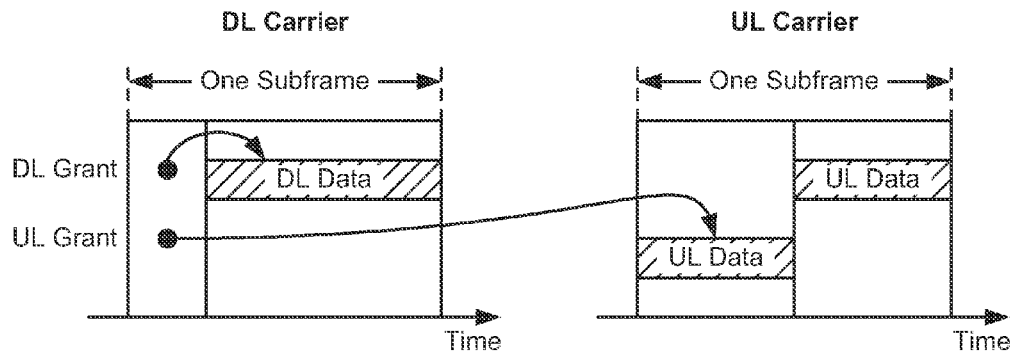
FIG. 3A shows an example of single-carrier operation.

FIG. 3A shows an example of single-carrier operation by a UE. As illustrated, the UE may operate on a single downlink (DL) carrier and a single uplink (UL) carrier for communication with an eNB. The eNB may send a DL grant and/or a UL grant for the UE on the PDCCH in the control region of a downlink subframe. The DL grant may comprise various parameters for a downlink data transmission from the eNB to the UE. The UL grant may comprise various parameters for an uplink data transmission from the UE to the eNB. The eNB may send the downlink data transmission to the UE on the PDSCH in the data region of the downlink subframe. The UE may send the uplink data transmission to the eNB on the PUSCH in the data region of an uplink subframe.

Figure 3B:
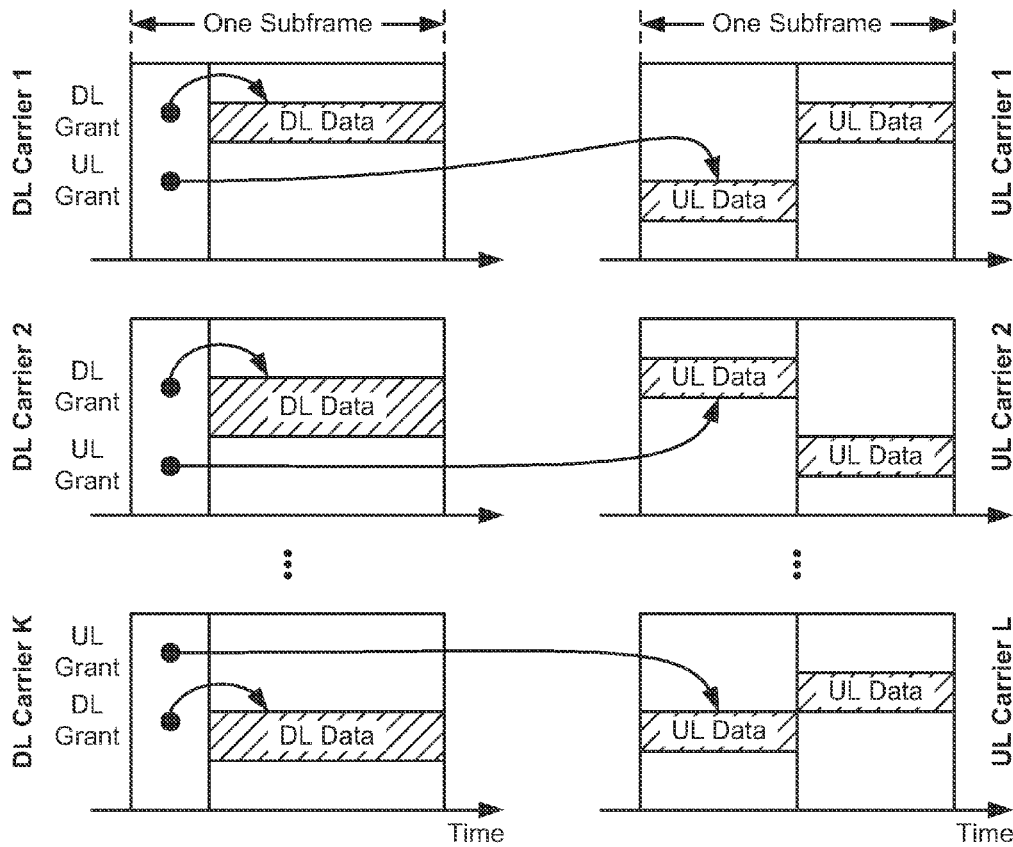
FIGS. 3B and 3C are examples of multi-carrier operation without and with cross-carrier signaling, respectively.

FIG. 3B shows an example of multi-carrier operation without cross-carrier signaling by a UE. Here, the UE may operate on 'K' DL carriers and 'L' UL carriers for communication with an eNB, where K may or may not be equal to L. Each UL carrier may be paired with one DL carrier. Control information to support data transmission on a given DL carrier may be sent on that DL carrier and/or an associated UL carrier. Similarly, control information to support data transmission on a given UL carrier may be sent on that UL carrier and/or an associated DL carrier.

Cross-carrier signaling refers to sending control information on one carrier to support data transmission on another carrier. For example, a DL grant may be sent on one DL carrier to support data transmission on another DL carrier. In one design of cross-carrier signaling, one carrier may be designated as a primary carrier for each of the downlink and the uplink, and the remaining carriers may be referred to as extension carriers. The primary carrier may also be referred to as an anchor carrier, a base carrier, etc. An extension carrier may also be referred to as a regular carrier, a secondary carrier, etc. A UE may be configured to operate on the primary carrier and zero or more extension carriers for each of the downlink and uplink.

Figure 3C:
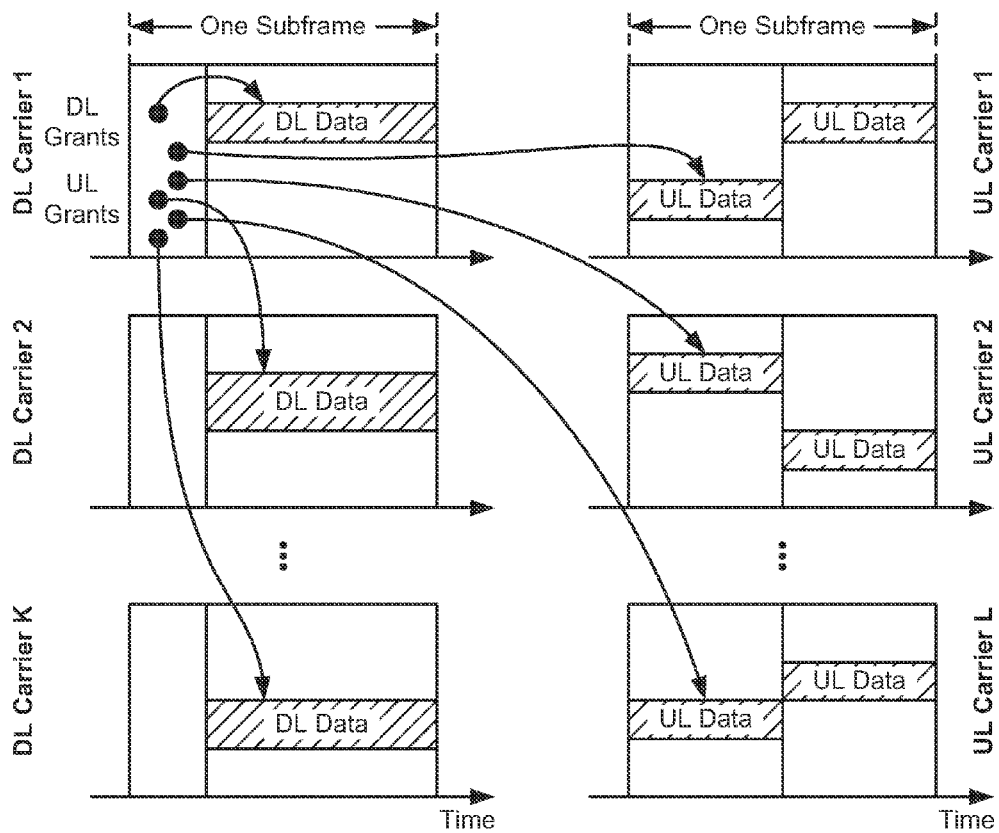

FIG. 3C shows an example of multi-carrier operation with cross-carrier signaling by a UE. In the example shown in FIG. 3C, DL carrier 1 may be a primary DL carrier for the UE, and UL carrier 1 may be a primary UL carrier for the UE. An eNB may send DCI (e.g., DL and UL grants) to the UE on the primary DL carrier to support data transmission on all DL and UL carriers. The UE may send UCI to the eNB on the primary UL carrier to support data transmission on all DL and UL carriers.

FIG. 3C shows one design of supporting cross-carrier signaling for multi-carrier operation using primary DL and UL carriers. Cross-carrier signaling may also be supported in other manners. In general, cross-carrier signaling may be supported in any manner that can send control information on one carrier to support data transmission on another carrier. For clarity, and not as a limitation of the disclosure, much of the description below assumes the design shown in FIG. 3C, with DCI being sent on the primary DL carrier and UCI being sent on the primary UL carrier to support cross-carrier signaling.

System 100 may support a number of DCI formats that may be used to send DCI on the downlink. Table 1 lists a set of DCI formats that may be supported by the system. DCI format 0 may be used to send UL grants for data transmission on the uplink. DCI formats 1, 1A, 1B, 1C and 1D may be used to send DL grants for data transmission of one codeword on the downlink. A codeword may correspond to a transport block or a packet. DCI formats 2, 2A and 2B may be used to send DL grants for data transmission of two codewords on the downlink for multiple-input multiple output (MIMO). DCI formats 3 and 3A may be used to send transmit power control (TPC) information to UEs. DCI formats 0, 1A, 3 and 3A have the same size. DCI formats 1, 1B, 1C, 1D, 2, 2A and 2B may have different sizes.

TABLE 1

DCI Formats

| DCI Format | Description |
| --- | --- |
| 0 | Used for scheduling uplink transmission on the PUSCH. |
| 1 | Used for scheduling transmission of one codeword on the PDSCH. |
| 1A | Used for compact scheduling of one codeword on the PDSCH and for random access procedure. |
| 1B | Used for compact scheduling of one codeword on the PDSCH with precoding information. |
| 1C | Used for very compact scheduling of one codeword on the PDSCH. |
| 1D | Used for compact scheduling of one codeword on the PDSCH with precoding and power offset information. |
| 2 | Used for scheduling two codewords on the PDSCH with closed-loop spatial multiplexing with cell-specific reference signal (CRS). |
| 2A | Used for scheduling two codewords on the PDSCH with open-loop spatial multiplexing with CRS. |
| 2B | Used for scheduling two codewords on the PDSCH with spatial multiplexing with precoded UE-specific reference signal. |
| 3 | Used for transmission of TPC commands for the PUCCH and PUSCH with 2-bit power adjustments. |
| 3A | Used for transmission of TPC commands for the PUCCH and PUSCH with 1-bit power adjustments. |

Table 1 lists DCI formats supported by LTE Release 9. Other DCI formats may also be supported, e.g., in future LTE releases. In addition, a set of DCI formats may be defined to support cross-carrier signaling. In one design, a DCI format supporting cross-carrier signaling may include (i) all fields of a corresponding DCI format not supporting cross-carrier signaling (e.g., one of the DCI formats shown in Table 1) and (ii) one or more additional fields to support cross-carrier signaling. In one design, cross-carrier signaling may be supported via a cross-carrier indicator field (CIF) that indicates a carrier on which a data transmission is scheduled. The CIF may have one or more of the following characteristics:

The presence of the CIF may be semi-statically enabled, e.g., via upper layer signaling, Configuration for the presence of the CIF may be specific for a UE, The CIF (if configured) may be a fixed-size field (e.g., of three bits to support up to eight carriers), The location of the CIF (if configured) may be fixed for all DCI formats regardless of their sizes, Cross-carrier grants may be configured both when the DCI formats for the UE have the same size or different sizes:

There may be an upper limit on the total number of blind decodes by the UE.

Figure 4:
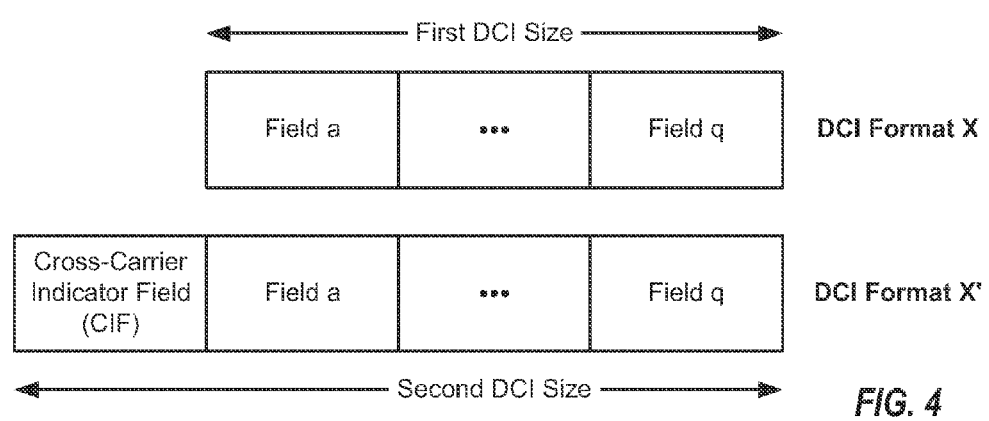
FIG. 4 shows two exemplary DCI formats.

FIG. 4 shows a DCI format X that does not support cross-carrier signaling. DCI format X may correspond to any one of the DCI formats shown in Table 1 and may include a number fields used to send different types of information. For example, DCI format X may be used for a grant and may include fields to convey resources allocated for data transmission, a modulation and coding scheme (MCS), precoding information, HARQ information, a TPC command, and/or other information.

FIG. 4 also shows a design of a DCI format X' that supports cross-carrier signaling. In this design, DCI format X' includes all of the fields in DCI format X and an additional field for the CIF. Because of the additional CIF, DCI format X' has a different size than that of the corresponding DCI format X.

In general, the CIF may be added to any one of the DCI formats shown in Table 1 to form a DCI format that supports cross-carrier signaling. For example, the CIF may be added to DCI formats 1A, 0 and 2 to form DCI formats 1A', 0' and 2', respectively. For clarity, in the description herein, a DCI format not supporting cross-carrier signaling may be denoted without a prime (e.g., DCI format X, where X may be any suitable designation). A DCI format supporting cross-carrier signaling may be denoted with a prime (e.g., DCI format X'). DCI format X' may include all fields in DCI format X and the CIF and/or other fields to support cross-carrier signaling.

In LTE Release 8 (Rel-8) and LTE Release 9 (Rel-9), a UE may be semi-statically configured by Radio Resource Control (RRC) with one of eight downlink transmission modes 1 to 8. For each downlink transmission mode, the UE may monitor two DCI formats: DCI format 1A and a mode-dependent DCI format. For example, the UE may monitor DCI format 1A as well as DCI format 2 for downlink transmission mode 4 for close-loop spatial multiplexing. For all downlink transmission modes, the UE may also monitor DCI format 0 used for uplink scheduling.

An eNB may send DCI to the UE on the PDCCH using any one of the DCI formats supported by the UE. The eNB may also send DCI on the PDCCH in 1, 2, 4 or 8 control channel elements (CCEs), which correspond to an aggregation level of 1, 2, 4 or 8, respectively. Each CCE may include nine resource elements, with each resource element covering one subcarrier in one symbol period. Different aggregation levels may be used for different levels of protection for the DCI. The eNB may send DCI to the UE only in certain CCEs, which may be located in a common search space and a UE-specific search space for the UE. The common search space may be applicable to all UEs whereas the UE-specific search space may be specific to the UE. The UE may have a number of PDCCH candidates in the common search space and the UE-specific search space. Each PDCCH candidate may correspond to a specific set of CCEs on which DCI can be sent to the UE. Table 2 lists the PDCCH candidates monitored by the UE for different aggregation levels in the common and UE-specific search spaces.

TABLE 2

PDCCH Candidates Monitored by a UE

| Type | Aggregation Level L | Search Space Size (in CCEs) | Number of PDCCH Candidates |
|---|---|---|---|
| UE-Specific | 1 | 6 | 6 |
| Search Space | 2 | 12 | 6 |
|  | 4 | 8 | 2 |
|  | 8 | 16 | 2 |
| Common | 4 | 16 | 4 |
| Search Space | 8 | 16 | 2 |

For each PDCCH candidate, the UE may perform a blind decode for each DCI size supported by the UE. The DCI size determines the number of information bits to send, which in turn affects the code rate. The total number of blind decodes may then be dependent on the number of PDCCH candidates and the number of DCI sizes supported by the UE. A blind decode may also be referred to as a decoding candidate.

DCI formats 1A and 0 have the same size. Hence, for any downlink transmission mode, there may be only two DCI sizes for unicast transmissions of DCI to the UE: one DCI size for DCI formats 1A and 0, and another DCI size for a mode-dependent DCI format. The UE may perform 22 blind decodes for the 22 PDCCH candidates in Table 2 for each of the two DCI sizes, or a total of 44 blind decodes.

DCI formats 1A and 0 may be used for all downlink transmission modes and carrier configurations. This enables the eNB to have one DCI format for each link (downlink and uplink) that the eNB can use to send DCI to the UE in any subframe regardless of the RRC configuration and reconfiguration of the UE. This design can combat a potential ambiguous duration when the UE is under RRC reconfiguration, as described below.

Figure 5A:
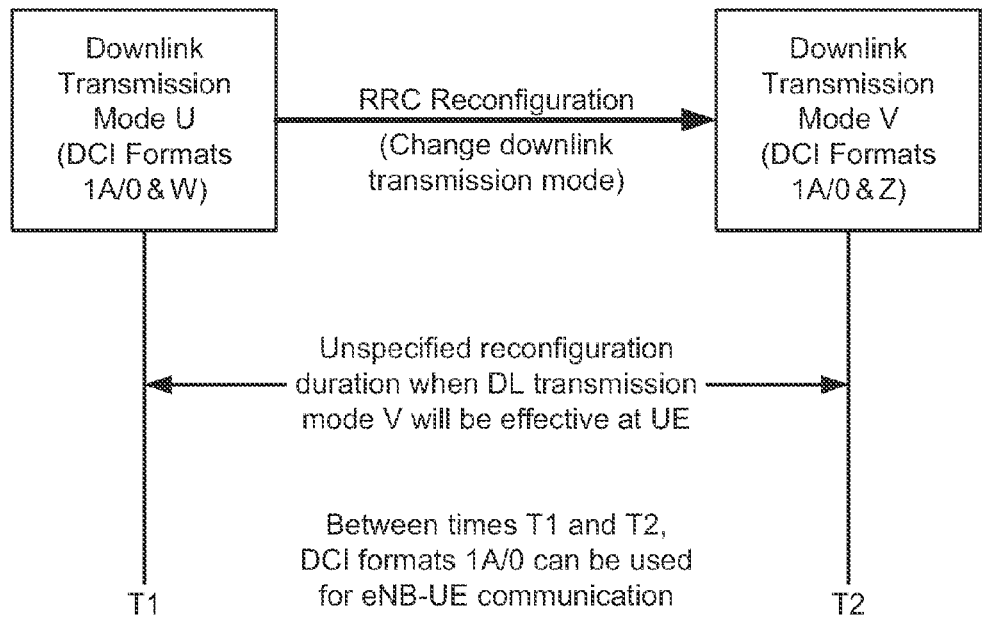
FIG. 5A shows reconfiguration for a different downlink transmission mode.

FIG. 5A shows an example of RRC reconfiguration for a different downlink transmission mode. Prior to time T1, a UE operates based on downlink transmission mode U and supports DCI formats 1A and 0 and a mode-dependent DCI format W. At time T1, a RRC reconfiguration is performed (e.g., by sending an RRC connection reconfiguration message from an eNB to the UE) to change the downlink transmission mode of the UE from mode U to mode V. At time T2, the UE may operate based on downlink transmission mode V and may support DCI formats 1A and 0 and a mode-dependent DCI format Z. The transition interval from time T1 to time T2 may be unspecified (since in LTE there is no "action time" at which the new downlink transmission mode V becomes effective). The eNB may not know the status of the UE and the particular downlink transmission mode supported by the UE during the RRC reconfiguration duration. Nevertheless, the eNB can send DCI to the UE using DCI formats 1A and 0, which are supported by the UE both before and after the RRC reconfiguration. The use of DCI formats 1A and 0 for all downlink transmission modes can thus enable non-interrupted eNB-UE communication during the transition interval.

Figure 5B:
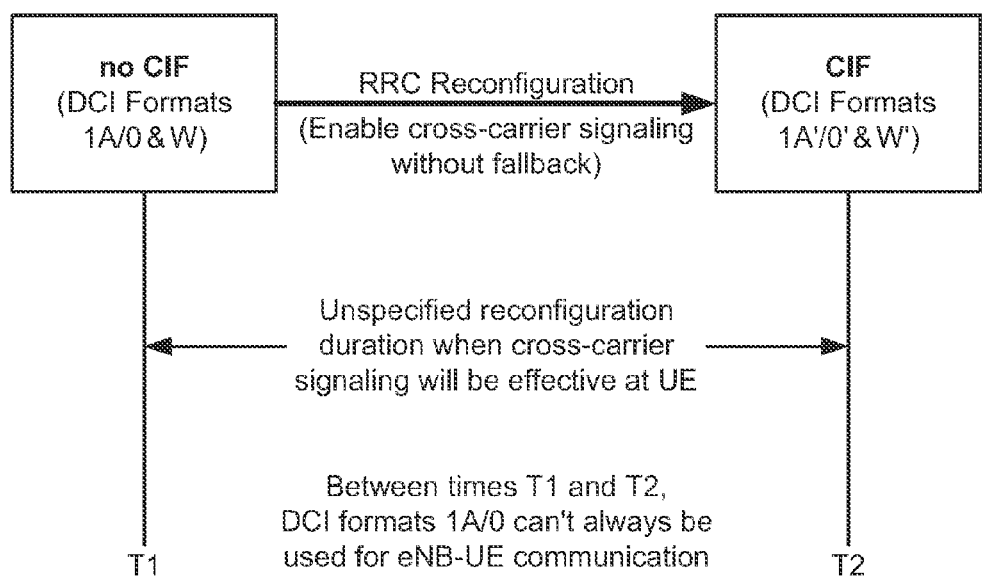
FIG. 5B shows reconfiguration for multi-carrier operation with cross-carrier signaling.

FIG. 5B shows an example of RRC reconfiguration for multi-carrier operation with cross-carrier signaling. Prior to time T1, a UE operates on one or multiple carriers and does not support cross-carrier signaling, which may be referred to as a "no-CIF" mode. The UE supports DCI formats 1A and 0 and a mode-dependent DCI format W prior to time T1. At time T1, a RRC reconfiguration is performed to change the operation of the UE to support cross-carrier signaling, which may be referred to as a "CIF" mode. At time T2, the UE operates with cross-carrier signaling and supports DCI formats 1A' and 0' and a mode-dependent DCI format W'.

As shown in FIG. 5B, when the UE is semi-statically reconfigured from no-CIF to CIF (or vice versa), there is no longer a common DCI format (before and after the RRC reconfiguration) per link to allow the eNB to reliably send DCI to the UE. This can result in missing DCI at the UE, which may degrade performance. For example, at time T3 within the transition interval T1-T2 (not shown in FIG. 5B), the eNB may assume that the UE has switched to the CIF mode and may send a DL grant based on DCI format 1A'. However, the UE may still operate in the no-CIF mode at time T3 and may perform blind decoding based on DCI format 1A. In this situation, the UE could miss the DL grant sent by the eNB and also miss the downlink data transmission sent based on the DL grant.

In an aspect, fallback operation may be supported for cross-carrier signaling in multi-carrier operation so that an eNB can reliably send DCI to a UE. Fallback operation may be supported by maintaining at least one common DCI format for each link before and after RRC reconfiguration, e.g., to enable or disable cross-carrier signaling.

In one design, the following may be assumed for cross-carrier signaling:
  A UE may be configured with cross-carrier signaling (or CIF) only if the UE is configured with two or more carriers, and
  Reconfiguration of CIF and the number of carriers for the UE are semi-static.

DCI formats supporting cross-carrier signaling (e.g., DCI formats with CIF) and DCI formats not supporting cross-carrier signaling (e.g., DCI formats without CIF) may have different sizes. Hence, a UE may perform two blind decodes for two DCI formats, with and without CIF, for each PDCCH candidate. The total number of blind decodes to perform by the UE may increase substantially in order to support fallback operation for cross-carrier signaling.

In one design, fallback operation may be supported on only a subset of all carriers. A carrier on which fallback operation is supported may be referred to as a fallback carrier. A carrier on which fallback operation is not supported may be referred to as a non-fallback carrier. For each fallback carrier, a UE may perform blind decoding for DCI formats with and without CIF. For each non-fallback carrier, the UE may perform blind decoding for only DCI formats with CIF. This may reduce the number of blind decodes for non-fallback carriers.

Figure 6:
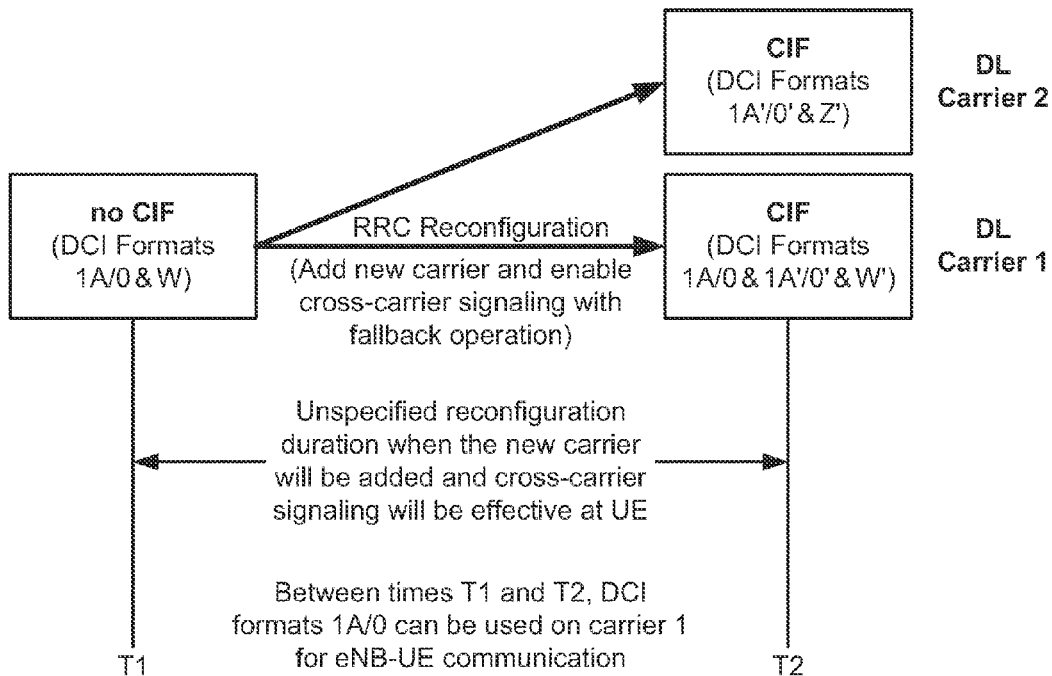
FIG. 6 shows an exemplary fallback operation when a new carrier is added.

FIG. 6 shows a design supporting fallback operation when a new carrier is added and cross-carrier signaling is enabled. In the example shown in FIG. 6, prior to time T1, a UE operates on carrier 1 and supports DCI formats 1A and 0 and a mode-dependent DCI format W. At time T1, a RRC reconfiguration is performed to add another carrier 2 and to activate cross-carrier signaling for the UE. At time T2, the UE operates on carriers 1 and 2 with cross-carrier signaling.

In a first design, the UE supports fallback operation on carrier 1 and does not support fallback on carrier 2, as shown in FIG. 6. In this design, at time T2, the UE may support the following:
Carrier 1—DCI formats 1A' and 0' (with CIF), DCI formats 1A and 0 (without CIF), and DCI format W' (with CIF, for the downlink transmission mode supported by the UE on carrier 1), and
Carrier 2—DCI formats 1A' and 0' (with CIF) and DCI format Z' (with CIF, for the downlink transmission mode supported by the UE on carrier 2).

In a second design, the UE may support fallback operation on both carriers 1 and 2. In this design, at time T2, the UE may support the following:
Carrier 1—DCI formats 1A' and 0', 1A and 0, and W', and
Carrier 2—DCI formats 1A' and 0', 1A and 0, and Z'.

Figure 7:
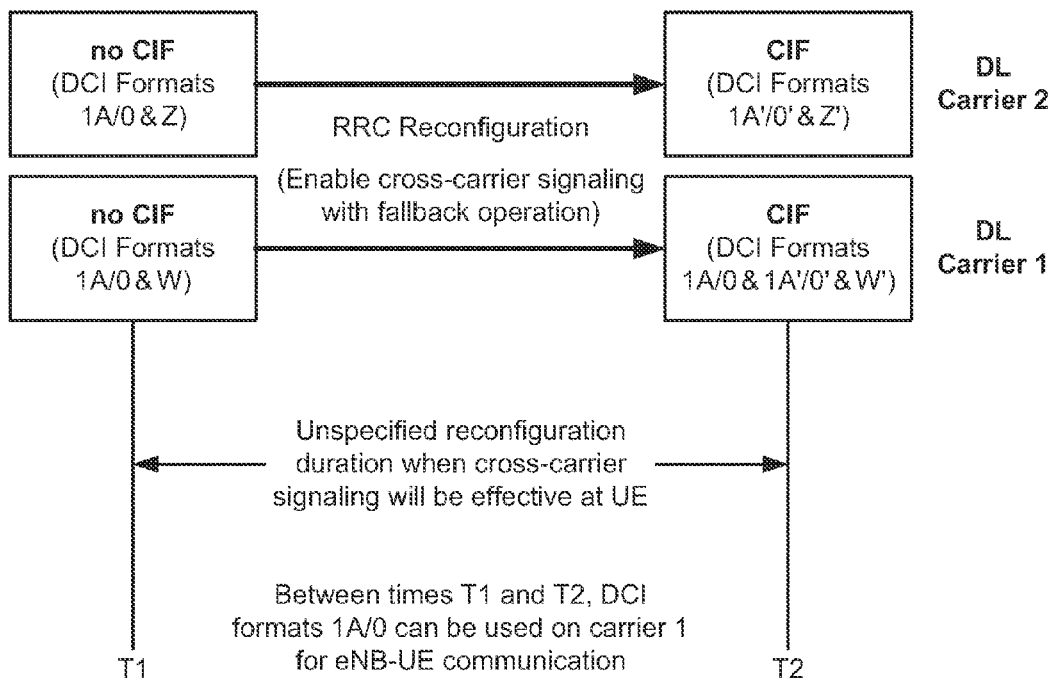
FIG. 7 shows an exemplary fallback operation when cross-carrier signaling is enabled.

FIG. 7 shows a design supporting fallback operation when cross-carrier signaling is enabled. In the example shown in FIG. 7, prior to time T1, the UE operates on two carriers 1 and 2 without cross-carrier signaling. The UE supports DCI formats 1A and 0 and a mode-dependent DCI format W on carrier 1 and further supports DCI formats 1A and 0 and a mode-dependent DCI format Z on carrier 2. At time T1, a RRC reconfiguration is performed to activate cross-carrier signaling for the UE. At time T2, the UE operates on carriers 1 and 2 with cross-carrier signaling.

In a first design, the UE supports fallback operation on carrier 1 and does not support fallback operation on carrier 2, as shown in FIG. 7. In this design, at time T2, the UE may support the following:
Carrier 1—DCI formats 1A' and 0', 1A and 0, and W', and
Carrier 2—DCI formats 1A' and 0' and Z'.

In a second design, the UE supports fallback operation on both carriers 1 and 2. The UE may then support DCI formats 1A' and 0', 1A and 0, and Z' on carrier 2.

In general, fallback operation may be supported on any number of carriers, which may be semi-statically reconfigured for the UE. For example, fallback operation may be supported on only the primary carrier, or the primary carrier and one or more other carriers, or some other carrier or combination of carriers. The fallback carrier(s) may be explicitly or implicitly configured, so that both the eNB and UE are aware of the fallback carrier(s). In one design, both DCI formats 1A and 0 may be supported on each fallback carrier, so that DCI can be reliably sent to control data transmission on the downlink and uplink.

In one design, fallback operation may be supported for only a subset of all PDCCH candidates in order to limit the number of blind decodes by a UE. The UE may perform three blind decodes for three DCI sizes for each PDCCH candidate—a first blind decode for DCI formats 1A and 0, a second blind decode for a mode-dependent DCI format, and a third blind decode for DCI formats 1A' and 0'. The UE may then perform a total of 66 blind decodes for three DCI sizes for one carrier. The total number of blind decodes may be reduced by placing certain restrictions on how DCI can be sent to the UE. These restrictions should minimally impact performance since fallback operation for RRC reconfiguration may be an infrequent event. Various designs for reducing the number of blind decodes are described below.

In a first design of reducing the number of blind decodes, DCI formats with and without CIF may be supported in different search spaces. Each search space may support either DCI formats with CIF or DCI formats without CIF. In one design, DCI formats without CIF (e.g., DCI formats 1A and 0) may be supported in the common search space, and DCI formats with CIF (e.g., DCI formats 1A', 0' and W') may be supported in the UE-specific search space, as shown in Table 3. DCI may be sent as unicast to a specific UE in the common or UE-specific search space using DCI format 1A, 0, 1A', 0' or W'. The unicast DCI may be scrambled with a UE-specific Radio Network Temporary Identifier (RNTI), such as a Cell RNTI (C-RNTI), a Semi-Persistent Scheduling (SPS) C-RNTI, a Temporary C-RNTI, etc. DCI may be sent as broadcast to all UEs in the common search space using DCI format 1A or 1C. The broadcast DCI may be scrambled with a RNTI known to all UEs, such as a System Information RNTI (SI-RNTI), a Paging RNTI (P-RNTI), a Random Access RNTI (RA-RNTI), etc. DCI for TPC information may be sent using DCI format 3 or 3A in the common search space and may be scrambled with a TPC-PUCCH RNTI or a TPC-PUSCH RNTI, which are known by the UEs.

TABLE 3

Search Space Partitioning for Fallback Carrier

| Search Space | Supported DCI Formats |
| --- | --- |
| Common Search Space | 1A: DL broadcast & unicast<br>0: UL unicast (same size as 1A)<br>1C: DL broadcast<br>3/3A: group power control (same size as 1A) |
| UE-Specific Search Space | 1A' (1A + CIF): DL unicast<br>0' (0 + CIF): UL unicast (same size as 1A')<br>W' (mode-dependent W + CIF): DL unicast |

With the design shown in Table 3, a UE may have two DCI sizes for the common search space and two DCI sizes for the UE-specific search space. The two DCI sizes for the common search space may include one DCI size for DCI formats 1A, 0, 3, and 3A and another DCI size for DCI format 1C. The two DCI sizes for the UE-specific search space may include one DCI size for DCI formats 1A' and 0' and another DCI size for DCI format W'. For the design shown in Table 3, the UE may perform the same number of bind decodes (e.g., 44) to support fallback operation with cross-carrier signaling as another UE that does not support this fallback operation.

The design in Table 3 may have no impact on scheduling a UE for (i) downlink data transmission on the same DL carrier on which DCI is sent and (ii) uplink data transmission on an UL carrier associated with this DL carrier. In these cases, the CIF is not needed. DL and UL grants may be sent to the UE in either (i) the common search space using DCI formats 1A and 0 or (ii) the UE-specific search space using DCI formats 1A' and 0'. The UE may be scheduled in both the common and UE-specific search spaces for data transmissions on the downlink and uplink.

Due to the search space restrictions, the design shown in Table 3 may have some impact on scheduling a UE for (i) downlink data transmission on a DL carrier different than the DL carrier on which DCI is sent and (ii) uplink data transmission on a UL carrier not associated with the DL carrier on which DCI is sent. In these cases, the CIF field may be used to indicate the DL or UL carrier on which data transmission is scheduled. The DL and UL grants may be sent to the UE in the UE-specific search space using DCI formats 1A' and 0' and not in the common search space.

In a second design of reducing the number of blind decodes, DCI formats with and without CIF may be supported in a subset of the search spaces. In one design, DCI formats without CIF (e.g., DCI formats 1A and 0) and some DCI formats with CIF (e.g., DCI formats 1A' and 0') may be supported in the common search space, as shown in Table 4. DCI formats with CIF (e.g., DCI formats 1A', 0' and W') may be supported in the UE-specific search space, as also shown in Table 4.

TABLE 4

Alternative Search Space Partitioning for Fallback Carrier

| Search Space | Supported DCI Formats |
| --- | --- |
| Common Search Space | 1A/1C: DL broadcast |
| | 1A/0: DL and UL unicast |
| | 1A'/0': DL and UL unicast |
| | 3/3A: group power control |
| UE-Specific Search Space | 1A'/0': DL and UL unicast |
| | W' (mode-dependent W + CIF): DL unicast |

The design shown in Table 4 may alleviate some scheduling restrictions imposed by the design shown in Table 3. In particular, DL and UL grants may be sent to a UE in both the common and UE-specific search spaces using DCI formats 1A' and 0'. The UE may perform more blind decodes in the common search space to support DCI formats with and without CIF.

For the design shown in Table 4, both DCI format 1A and DCI format 1A' with the CIF set to '000' (for cross-carrier addressing the same DL carrier) may be used in the common search space to send a DL grant on a DL carrier to schedule a UE for data transmission on the same DL carrier. Supporting DCI format 1A as well as DCI format 1A' with the CIF set to '000' is duplicative. Hence, DCI formats 1A' and 0' with the CIF set to '000' may be avoided in the common search space, and DCI formats 1A and 0 may be used instead.

In a third design of reducing the number of blind decodes, fallback operation may not be supported on certain carriers. In one design, DCI formats with CIF (e.g., DCI formats 1A', 0' and W') may be supported in the common and UE-specific search spaces for a non-fallback carrier, as shown in Table 5. DCI may be sent as unicast to a specific UE in the common or UE-specific search space using DCI format 1A', 0' or W'. DCI may be sent as broadcast to all UEs in the common search space using DCI format 1A or 1C. DCI for TPC information may be sent using DCI format 3 or 3A in the common search space.

TABLE 5

Search Space Partitioning Non-Fallback Carrier

| Search Space | Supported DCI Formats |
| --- | --- |
| Common Search Space | 1A/1C: DL broadcast |
| | 1A'/0': DL and UL unicast |
| | 3/3A: group power control |
| UE-Specific Search Space | 1A'/0': DL and UL unicast |
| | W': DL unicast |

In a fourth design of reducing the number of blind decodes, DCI formats with and without CIF may be supported for different sets of PDCCH candidates. As shown in Table 2, there are two aggregation levels of 4 and 8 in the common search space, with aggregation level 4 including 4 PDCCH candidates and aggregation level 8 including 2 PDCCH candidates. As also shown in Table 2, there are four aggregation levels of 1, 2, 4 and 8 in the UE-specific search space, with aggregation level 1 including 6 PDCCH candidates, aggregation level 2 including 6 PDCCH candidates, aggregation level 4 including 2 PDCCH candidates, and aggregation level 8 including 2 PDCCH candidates. In one design, for a given aggregation level in a given search space, DCI formats without CIF may be allowed for some PDCCH candidates, and DCI formats with CIF may be allowed for the remaining PDCCH candidates. As an example, for aggregation level 4 in the common search space, DCI formats 1A and 0 may be allowed for the first two PDCCH candidates, and DCI formats 1A' and 0' may be allowed for the last two PDCCH candidates. As another example, for aggregation level 8 in the common search space, DCI formats 1A and 0 may be allowed for the first PDCCH candidate, and DCI formats 1A' and 0' may be allowed for the other PDCCH candidate.

In general, each aggregation level in each search space may support only DCI formats without CIF, or only DCI formats with CIF, or both. If a given aggregation level in a given search space supports DCI formats with and without CIF, then any number of PDCCH candidates may support DCI formats without CIF, and any number of PDCCH candidates may support DCI formats without CIF. Furthermore, a given PDCCH candidate may support only DCI formats without CIF, or only DCI formats with CIF, or both. The aggregation levels in the common and UE-specific search spaces may be defined in various manners. For example, each aggregation level in the common search space may support DCI formats with and without CIF whereas each aggregation level in the UE-specific search space may support only DCI formats with CIF.

Other designs of reducing the number of blind decodes may also be implemented. Any one or any combination of these designs may be implemented to reduce the number of blind decodes.

In general, to reduce the number of blind decodes, fallback operation may be supported:

Only on one or more designated carriers instead of all carriers,

Only in the common search space or the UE-specific search space on a carrier,

Only in one or more designated aggregation levels, and/or

Only for a subset of PDCCH candidates.

In one design, a first set of PDCCH candidates may support DCI formats without CIF, and a second set of PDCCH candidates may support DCI formats with CIF. In one design, the first set may be non-overlapping with the second set, so that each PDCCH candidate may be included in only one set. In another design, the first set may be overlapping with the second set, so that one or more PDCCH candidates may be included in both sets.

The first and second sets of PDCCH candidates may be defined in various manners. In one design, the first set may include PDCCH candidates in one search space, and the second set may include PDCCH candidates in another search space, e.g., as shown in Table 3. In another design, the first set may include PDCCH candidates for some aggregation levels, and the second set may include PDCCH candidates for other aggregation levels. In yet another design, the first set may include some PDCCH candidates in a given aggregation level or a given search space, and the second set may include other PDCCH candidates in the aggregation level or search space. The first and second sets may also be defined in other manners based on search space, aggregation level, etc., to obtain the desired total number of blind decodes and the desired scheduling flexibility for the UEs.

In another aspect, a transition monitoring mode may be defined in which a UE skips monitoring a mode-dependent DCI format during reconfiguration from the no-CIF mode to the CIF mode, or vice versa, in order to reduce the number of blind decodes. During the transition interval, the UE may support DCI formats 1A and 0 without CIF and DCI formats 1A' and 0' with CIF in order to support fallback operation. However, the UE may not support a mode-dependent DCI format during the transition interval. The UE may then perform blind decoding for just two DCI sizes during the transition interval.

For clarity, the description below assumes the case of reconfiguration to activate cross-carrier signaling. However, the designs described below may apply equally to the case of reconfiguration to deactivate cross-carrier signaling on the downlink, and also to cases of reconfiguration for uplink carriers.

Figure 8:
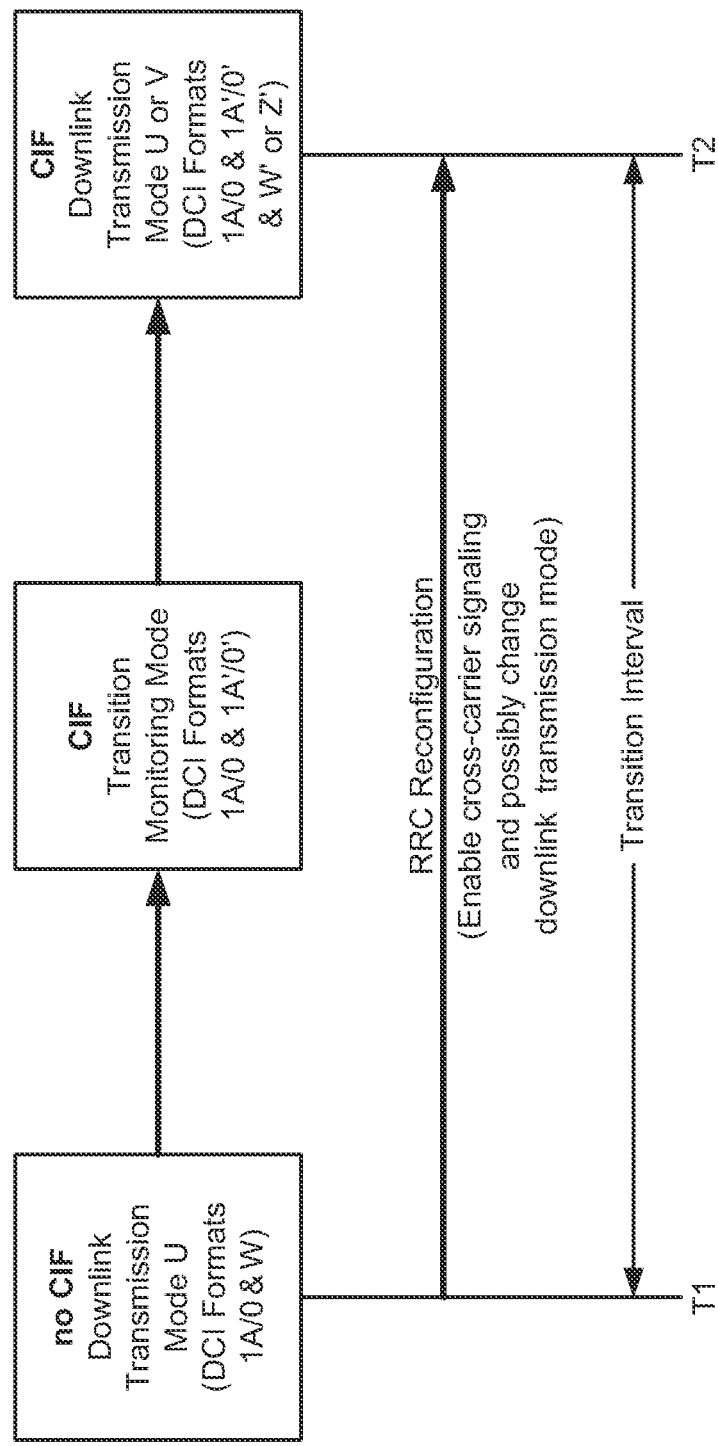
FIG. 8 shows an exemplary fallback operation during a transition interval for reconfiguration.

FIG. 8 shows a design of supporting fallback operation during a transition interval for reconfiguration to activate cross-carrier signaling. In the example shown in FIG. 8, prior to time T1, a UE supports DCI formats 1A and 0 and a mode-dependent DCI format W. At time T1, a RRC reconfiguration is performed to activate cross-carrier signaling and possibly change a downlink transmission mode for the UE. At time T2, the UE operates with cross-carrier signaling and supports DCI formats 1A and 0 without CIF and DCI formats 1A' and 0' with CIF. The UE also supports either a mode-dependent DCI format Z' with CIF for a new downlink transmission mode (as shown in FIG. 8) or a mode-dependent DCI format W' with CIF for the old downlink transmission mode (not shown in FIG. 8).

During the transition interval from time T1 to time T2, the UE monitors DCI formats 1A and 0 without CIF and DCI formats 1A' and 0' with CIF. The UE skips monitoring the mode-dependent DCI format during the transition interval. The UE may perform blind decoding for just two DCI sizes during the transition interval.

The mode-dependent DCI format is typically used to support a higher data rate. Reconfiguration may be an infrequently event, and the transition interval may be relatively short. As a result, there may be negligible performance impact due to the UE not monitoring the mode-dependent DCI format during the transition interval.

In one design, the transition monitoring mode may be applicable for only a subset of all carriers configured for the UE (e.g., only for the primary carrier). In another design, the transition monitoring mode may be applicable for all fallback carriers. The transition monitoring mode may not be applicable if the UE is only configured with one carrier or if there is no fallback carrier.

The transition monitoring mode may also be restricted in other manners. In one design, the transition monitoring mode may be applicable for the UE-specific search space but not the common search space. In this design, the UE may monitor DCI formats 1A and 0 and a mode-dependent DCI format (e.g., with or without CIF) in the common search space during the transition interval.

The transition interval may be defined in various manners and may be defined in different manners for an eNB and a UE involved in reconfiguration. In one design, for the eNB, the transition interval may start when the eNB starts a CIF-related RRC reconfiguration procedure, which may be when a RRCConnectionReconfigutation message is sent by the eNB. The transition interval may end when the RRC reconfiguration procedure is completed, which may be when a RRCConnectionReconfigurationComplete message is received by the eNB.

In one design, for the UE, the transition interval may start when the UE becomes aware of the CIF-related RRC reconfiguration procedure, which may be when the RRCConnectionReconfigutation message is received. The transition interval may end when the UE receives an acknowledgement that the eNB has received the RRCConnectionReconfiguration-Complete message sent by the UE. The UE may send the RRCConnectionReconfigurationComplete message on the PUSCH to the eNB, and the eNB may send an ACK on a Physical HARQ Indicator Channel (PHICH) for a PUSCH transmission containing the message.

The start and end of the transition interval at the eNB may be different from the start and end of the transition interval at the UE, e.g., due to delay in sending and receiving the RRC messages for reconfiguration. In one design, additional protection of the start and end of the transition interval may be achieved with the use of timers. For example, the transition interval may be extended for both the eNB and the UE by some time period after successful transfer of the RRCConnectionReconfigurationComplete message. Other timers such as a minimum timer, or a maximum timer, or both may also be used.

In one design, an eNB may send double grants using both DCI formats with and without CIF during the transition interval. The eNB may generate a first grant based on a DCI format without CIF (e.g., DCI format 1A, 0 or Z), generate a second grant based on a DCI format with CIF (e.g., DCI format 1A', 0' or Z'), and send both grants to the UE. The eNB may continue to send double grants whenever the UE is scheduled until the eNB is certain that an RRC reconfiguration message has reached the UE. The eNB may determine this based on (i) a Radio Link Control (RLC) ACK received for the RRC reconfiguration message or (ii) an RRC reconfiguration complete message received from the UE. This design may ensure that the UE can receive at least one grant whenever the UE is scheduled for data transmission.

In one design, the double grants sent using DCI formats with and without CIF may point to the same resources for the PDSCH or PUSCH assigned to the UE. In this design, PDSCH/PUSCH resources are not wasted, and the double grants only result in the use of additional PDCCH resources. In another design, the double grants may be for different PDSCH/PUSCH resources. In this design, the UE may utilize the PDSCH/PUSCH resources indicated by the grant received by the UE and may not utilize the PDSCH/PUSCH resources indicated by the grant missed by the UE. However, the eNB may be able to determine which grant was received by the UE, and hence the configuration of the UE, based on (i) the particular PUSCH resources used by the UE for data transmission on the uplink or (ii) the particular PUCCH resources used by the UE to send ACK/NACK feedback for data transmission on the downlink.

The eNB may send double grants such that the UE does not perform additional blind decodes. Furthermore, the eNB may send double grants without scheduler and/or search space restrictions imposed by some of the designs described above. However, additional PUCCH resources may be consumed to send double grants, which may impose additional burden on the PDCCH during the transition interval. The additional PUCCH resource usage may have negligible overall impact since RRC reconfiguration may be infrequent and the transition interval may be relatively short.

The techniques described herein may be used for operation on any number of carriers with cross-carrier signaling. These carriers may have the same bandwidth or different bandwidths. The DCI sizes may be associated with the carrier bandwidth. However, if multiple carriers of different bandwidths have the same DCI sizes for some DCI formats, then zero-padding or some other schemes may be used to differentiate the DCI formats for different carriers for DCI sent on a given carrier. Cross-carrier signaling may then be implicitly realized without using CIF.

If zero-padding is applied on DCI format 1A for one or more carriers, then these carrier(s) may also need fallback for DCI format 1A. In that case, the designs described above may be used to support fallback operation on each such carrier.

Figure 9:
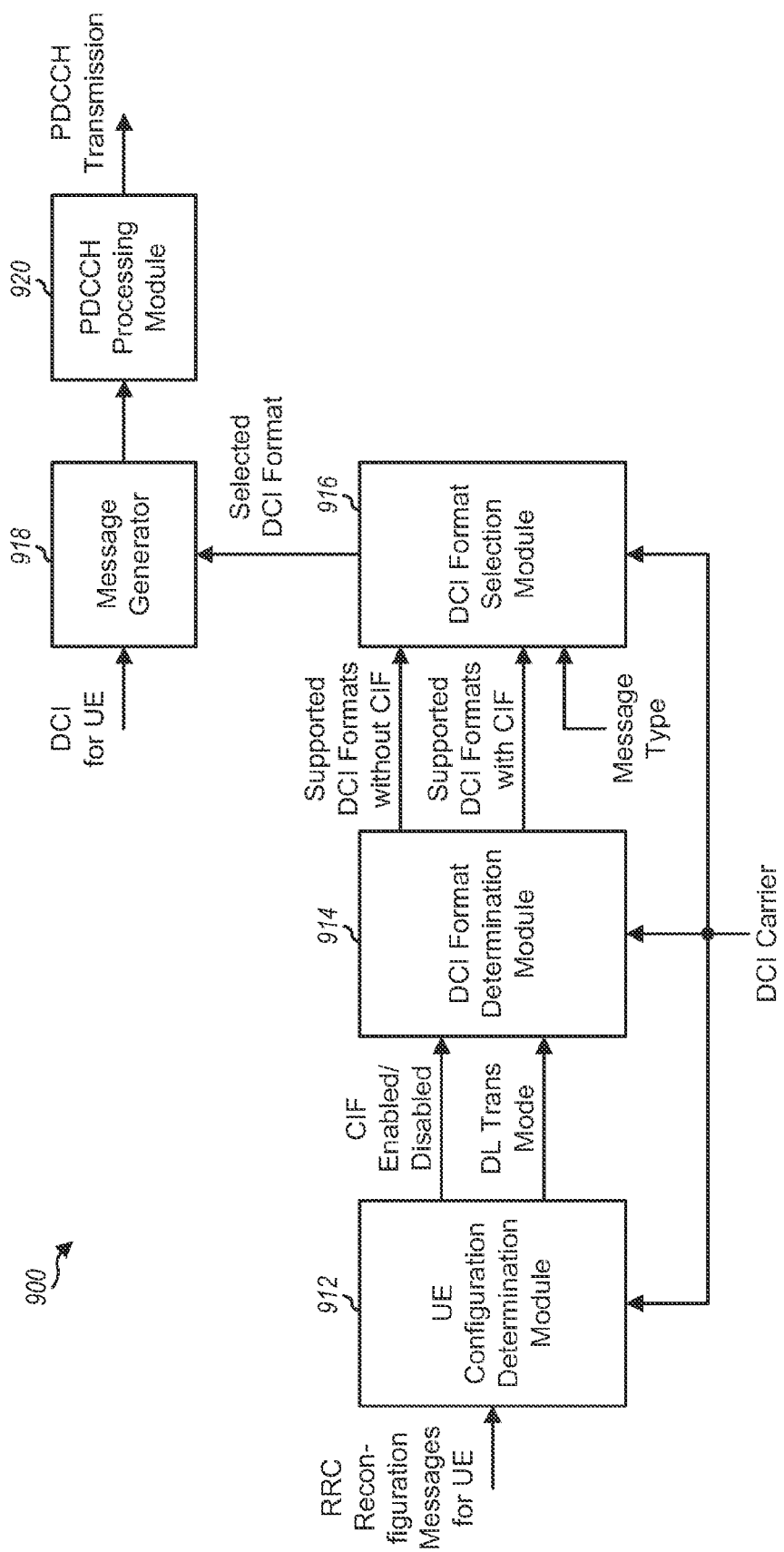
FIG. 9 shows a block diagram of an exemplary message generator at a base station.

FIG. 9 shows a block diagram of a design of a message generator 900, which may be part of an eNB. Within message generator 900, a module 912 may receive RRC reconfiguration messages for a UE and may determine the operating state of the UE. For example, module 912 may determine whether the UE is operating on one carrier or multiple carriers, whether cross-carrier signaling (or CIF) is enabled for the UE, the downlink transmission mode configured for the UE on each carrier, etc. Module 912 may receive an indication of a carrier on which DCI will be sent to the UE, which may be referred to as a DCI carrier. Module 912 may then provide an indication of whether cross-carrier signaling is enabled for the UE on the DCI carrier and the downlink transmission mode configured for the UE on the DCI carrier.

A module 914 may receive the indication of the DCI carrier, the indication of whether CIF is enabled for the UE, and the downlink transmission mode for the UE on the DCI carrier. Module 914 may provide a set of DCI formats supported by the UE on the DCI carrier. The supported DCI formats may include DCI formats without CIF and DCI formats with CIF. A module 916 may receive the indication of the DCI carrier, the set of supported DCI formats, and a message type of DCI to send to the UE and may provide a selected DCI format.

A message generator 918 may receive the DCI to send to the UE and the selected DCI format and may generate a PUCCH message based on the selected DCI format. A module 920 may receive the PUCCH message and an indication of the CCEs selected for use for the PUCCH and may generate a PUCCH transmission with the PUCCH message sent on the selected CCEs.

Figure 10:
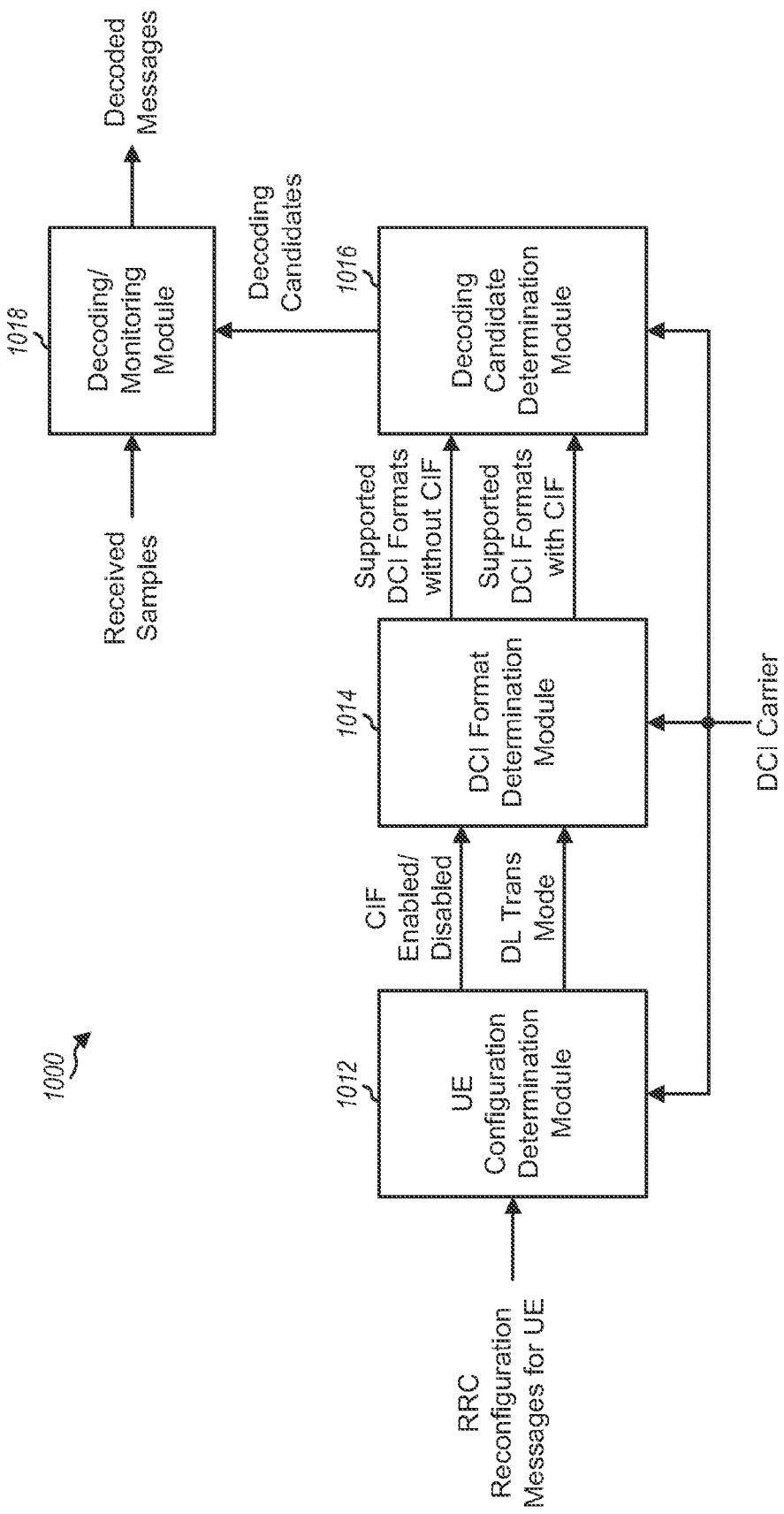
FIG. 10 shows a block diagram of an exemplary message detector at a UE.

FIG. 10 shows a block diagram of a design of a message detector 1000, which may be part of a UE. Within message detector 1000, a module 1012 may receive RRC reconfiguration messages for the UE and may determine the operating state of the UE. For example, module 1012 may determine whether the UE is operating on one carrier or multiple carriers, whether cross-carrier signaling (or CIF) is enabled for the UE, the downlink transmission mode selected for the UE on each carrier, etc. Module 1012 may receive an indication of a carrier on which to detect for DCI, which may be referred to as a DCI carrier. Module 1012 may provide an indication of whether cross-carrier signaling is enabled for the UE and the downlink transmission mode for the DCI carrier.

A module 1014 may receive the indication of the DCI carrier, the indication of whether CIF is enabled, and the downlink transmission mode for the DCI carrier and may provide a set of DCI formats supported on the DCI carrier. A module 1016 may receive the indication of the DCI carrier and the set of supported DCI formats and may determine a set of decoding candidates for the DCI carrier. Each decoding candidate may correspond to a unique combination of a particular PDCCH candidate and a particular DCI size. The decoding candidates may be dependent on which DCI formats are allowed for each PDCCH candidate on the DCI carrier, as described above. A module 1018 may decode received samples based on each of the decoding candidates provided by module 1016. Module 1018 may provide decoded PUCCH messages corresponding to valid decoding candidates.

FIG. 11 shows a design of a process 1100 for receiving DCI in a wireless communication system. Process 1100 may be performed by a UE (as described below) or by some other entity. The UE may determine at least one first DCI format (e.g., DCI formats without CIF) to monitor on a first carrier (block 1112). The UE may monitor for the at least one first DCI format on the first carrier to detect DCI sent to the UE (block 1114). The UE may receive a reconfiguration message related to communication on a plurality of carriers by the UE with cross-carrier signaling (block 1116). The UE may determine at least one second DCI format (e.g., DCI formats with CIF) to monitor on the first carrier based on the reconfiguration message (block 1118). The UE may monitor for the at least one first DCI format and the at least one second DCI format on the first carrier after receiving the reconfiguration message to detect DCI sent to the UE (block 1120).

In one design, each second DCI format may comprise a corresponding first DCI format and at least one additional field supporting cross-carrier signaling, e.g., as shown in FIG. 4. In one design, the at least one additional field may comprise CIF, which may indicate a carrier on which a data transmission is scheduled. The at least one additional field may also include different and/or other fields to support cross-carrier signaling. In one design, the at least one first DCI format may have a first size, and the at least one second DCI format may have a second size that is different from the first size.

In one design, fallback operation may be supported for certain DCI formats on the first carrier. In one design, the at least one first DCI format may include DCI format 1A for downlink grants, or DCI format 0 for uplink grants, or some other DCI formats, or a combination thereof. In one design, the at least one second DCI format may include DCI format 1A' comprising DCI format 1A and the CIF, or DCI format 0' comprising DCI format 0 and the CIF, or some other DCI formats, or a combination thereof.

In one design, fallback operation may be supported for a mode-dependent DCI format. In another design, fallback operation may not be supported for a mode-dependent DCI format. In this design, the UE may determine a third DCI format to monitor on the first carrier prior to receiving the reconfiguration message. The UE may monitor for the third DCI format on the first carrier, prior to receiving the reconfiguration message, to detect DCI sent to the UE. The UE may determine a fourth DCI format to monitor on the first carrier after receiving the reconfiguration message. The UE may monitor for the fourth DCI format but not the third DCI format on the first carrier, after receiving the reconfiguration message, to detect DCI sent to the UE. The third and fourth DCI formats may be associated with a transmission mode of the UE on the first carrier. For example, the third DCI format may be any one of the DCI formats shown in Table 1, and the fourth DCI format may comprise the third DCI format and the CIF.

In one design, fallback operation may be supported on all carriers. In another design, fallback operation may be limited to one or more designated carriers. In this design, the UE may monitor for the at least one first DCI format and the at least one second DCI format on a subset of the plurality of carriers after receiving the reconfiguration message. This subset may include the first carrier, which may be a primary carrier. The UE may monitor for the at least one second DCI format but not the at least one first DCI format on remaining ones of the plurality of carriers after receiving the reconfiguration message.

In one design, fallback operation may be supported for all search spaces on the first carrier. For block 1120, the UE may monitor for the at least one second DCI format in all search spaces for the UE on the first carrier. In another design, fallback operation may be limited to a subset of the search spaces for the UE on the first carrier. For block 1120, the UE may monitor for the at least one second DCI format in a UE-specific search space but not a common search space, e.g., as shown in Table 3.

In one design, fallback operation may be supported for all PDCCH candidates for the UE on the first carrier. The UE may determine a plurality of PDCCH candidates for the UE on the first carrier. The UE may decode the plurality of PDCCH candidates based on the at least one first DCI format and also the at least one second DCI format.

In another design, fallback operation may be supported for a subset of the PDCCH candidates for the UE on the first carrier. The UE may determine a first set of PDCCH candidates and a second set of PDCCH candidates for the UE on the first carrier. The UE may decode the first set of PDCCH candidates for the at least one first DCI format but not the at least one second DCI format. The UE may decode the second set of PDCCH candidates for the at least one first DCI format and the at least one second DCI format. In one design, the first set of PDCCH candidates may be for the common search space for the UE on the first carrier, and the second set of PDCCH candidates may be for the UE-specific search space for the UE on the first carrier, as shown in Table 3. In another design, the first and second sets of PDCCH candidates may correspond to different parts of a search space for the UE on the first carrier. In yet another design, the first and second sets of PDCCH candidates may correspond to different parts of an aggregation level for a search space for the UE on the first carrier. The first and second sets of PDCCH candidates may also be defined in other manners.

In one design, a transition monitoring mode may be supported. The UE may determine a third DCI format (e.g., a mode-dependent DCI format) to monitor on the first carrier prior to receiving the reconfiguration message to detect DCI sent to the UE. The UE may monitor for the at least one first DCI format and the at least one second DCI format, but not the third DCI format, on the first carrier during a transition interval for reconfiguration of the UE based on the reconfiguration message (e.g., as shown in FIG. 8). The UE may determine the start of the transition interval based on the time at which the reconfiguration message is received by the UE. The UE may send a reconfiguration complete message to the base station and may thereafter receive an acknowledgement for this message. The UE may determine the end of the transition interval based on (i) the time $T_x$ at which the reconfiguration complete message is sent by the UE or (ii) the time $T_y$ at which the acknowledgement for the reconfiguration complete message is received by the UE. The UE may also determine the end of the transition interval based further on a timer, which may be started at time $T_x$ or time $T_y$.

In one design, fallback operation may be activated when a new carrier is added for the UE, e.g. as shown in FIG. 6. The UE may receive data (i) on a single carrier (e.g., the first carrier) prior to receiving the reconfiguration message and (ii) on the plurality of carriers with cross-carrier signaling after receiving the reconfiguration message. In one design, fallback operation may be activated when cross-carrier signaling (or CIF) is activated, e.g., as shown in FIG. 7. The UE may receive data on the plurality of carriers (i) without cross-carrier signaling prior to receiving the reconfiguration message and (ii) with cross-carrier signaling after receiving the reconfiguration message.

FIG. 12 shows a design of a process 1200 for sending DCI in a wireless communication system. Process 1200 may be performed by a base station/eNB (as described below) or by some other entity. The base station may determine at least one first DCI format monitored by a UE on a first carrier (block 1212). The base station may send DCI on the first carrier to the UE based on the at least one first DCI format (block 1214). The base station may send to the UE a reconfiguration message related to communication on a plurality of carriers by the UE with cross-carrier signaling (block 1216). The base station may determine at least one second DCI format monitored by the UE on the first carrier in response to the reconfiguration message (block 1218). The base station may send DCI on the first carrier to the UE based on the at least one first DCI format and the at least one second DCI format after sending the reconfiguration message (block 1220). The first and second DCI formats may be as described above for FIG. 11.

In one design, fallback operation may be supported for certain DCI formats (e.g., DCI formats 1A and 0) on the first carrier. In one design, fallback operation may not be supported for a mode-dependent DCI format. The base station may determine a third DCI format monitored by the UE on the first carrier prior to sending the reconfiguration message. The base station may send DCI on the first carrier to the UE based further on the third DCI format prior to sending the reconfiguration message. The base station may determine a fourth DCI format monitored by the UE on the first carrier after sending the reconfiguration message. The base station may send DCI on the first carrier to the UE based further on the fourth DCI format but not the third DCI format after sending the reconfiguration message. The third and fourth DCI formats may be associated with a transmission mode of the UE on the first carrier.

In one design, fallback operation may be supported on all carriers. In another design, fallback operation may be limited to one or more designated carriers. In this design, the base station may send DCI to the UE based on the at least one first DCI format and the at least one second DCI format on a subset of the plurality of carriers after sending the reconfiguration message. The base station may send DCI to the UE based on the at least one second DCI format but not the at least one first DCI format on the remaining ones of the plurality of carriers after sending the reconfiguration message.

In one design, fallback operation may be supported for all search spaces for the UE on the first carrier. In another design, fallback operation may be limited to a subset of the search spaces for the UE on the first carrier. For example, the base station may send DCI to the UE based on the at least one second DCI format in a UE-specific search space but not a common search space for the UE on the first carrier, e.g., as shown in Table 3.

In one design, fallback operation may be supported for all PDCCH candidates for the UE on the first carrier. In another design, fallback operation may be supported for a subset of the PDCCH candidates for the UE on the first carrier. For this design, the base station may send DCI based on the at least one first DCI format but not the at least one second DCI format in a first set of PDCCH candidates for the UE on the first carrier. The base station may send DCI based on the at least one first DCI format and the at least one second DCI format in a second set of PDCCH candidates for the UE on the first carrier. The first and second sets of PDCCH candidates may be defined in various manners, as described above for FIG. 11.

In one design, fallback operation may be activated when a new carrier is added for the UE, e.g., as shown in FIG. 6. The base station may send data to the UE (i) on a single carrier prior to sending the reconfiguration message and (ii) on the plurality of carriers with cross-carrier signaling after sending the reconfiguration message. In one design, fallback operation may be activated when cross-carrier signaling (or CIF) is activated, e.g., as shown in FIG. 7. The base station may send data to the UE on the plurality of carriers (i) without cross-carrier signaling prior to sending the reconfiguration message and (ii) with cross-carrier signaling after sending the reconfiguration message.

In one design, the base station may send double assignments/grants. The base station may generate a first grant for a data transmission to the UE based on one of the at least one first DCI format. The base station may generate a second grant for the data transmission to the UE based on one of the at least one second DCI format. The base station may send the first and second grants to the UE, e.g., in the same subframe.

Figure 13:
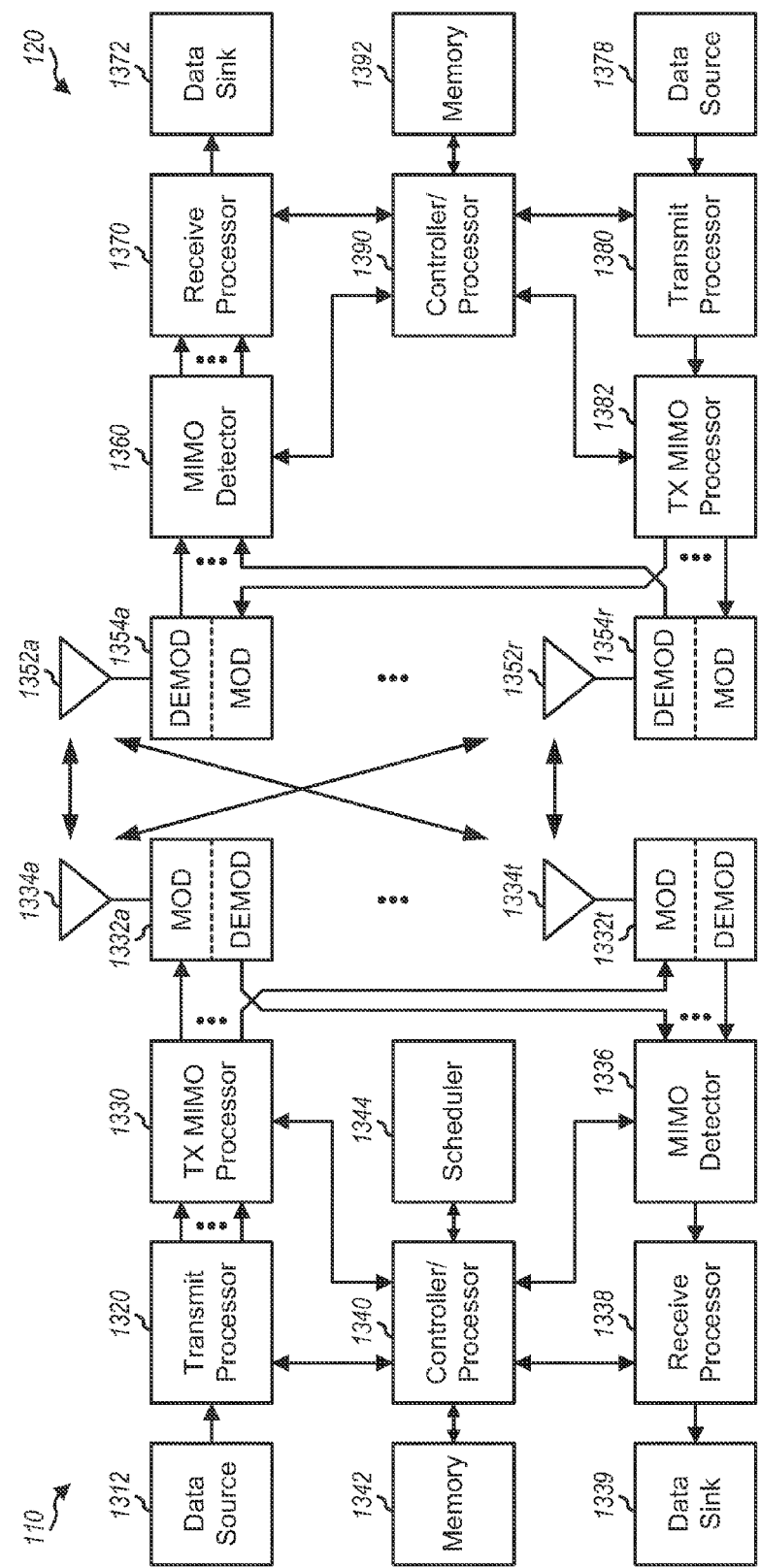
FIG. 13 shows an exemplary block diagram of a base station and a UE.

FIG. 13 shows a block diagram of a design of a base station/eNB 110 and a UE 120, which may be one of the base stations/eNBs and one of the UEs in FIG. 1. Base station 110 may be equipped with T antennas 1334a through 1334t, and UE 120 may be equipped with R antennas 1352a through 1352r, where in general T≥1 and R≥1.

At base station 110, a transmit processor 1320 may receive data from a data source 1312 for one or more UEs scheduled for downlink data transmission, process (e.g., encode and modulate) the data for each UE based on one or more modulation and coding schemes selected for that UE, and provide data symbols for all UEs. Transmit processor 1320 may also process control information (e.g., grants, reconfiguration messages, etc.) and provide control symbols. Transmit processor 1320 may also generate reference symbols for synchronization signals and reference signals. A transmit (TX) MIMO processor 1330 may precode the data symbols, the control symbols, and/or the reference symbols (if applicable) and may provide T output symbol streams to T modulators (MOD) 1332a through 1332t. Each modulator 1332 may process its output symbol stream (e.g., for OFDM, etc.) to obtain an output sample stream. Each modulator 1332 may further condition (e.g., convert to analog, filter, amplify, and upconvert) its output sample stream and generate a downlink signal. T downlink signals from modulators 1332a through 1332t may be transmitted via T antennas 1334a through 1334t, respectively.

At UE 120, R antennas 1352a through 1352r may receive the downlink signals from base station 110, and each antenna 1352 may provide a received signal to an associated demodulator (DEMOD) 1354. Each demodulator 1354 may condition (e.g., filter, amplify, downconvert, and digitize) its received signal to obtain samples and may further process the samples (e.g., for OFDM, etc.) to obtain received symbols. A MIMO detector 1360 may obtain received symbols from all demodulators 1354, perform MIMO detection on the received symbols if applicable, and provide detected symbols. A receive processor 1370 may process (e.g., demodulate and decode) the detected symbols, provide decoded data for UE 120 to a data sink 1372, and provide decoded control information to a controller/processor 1390.

On the uplink, at UE 120, data from a data source 1378, control information (e.g., ACK information, CQI information, etc.) from controller/processor 1390, and reference signals may be processed by a transmit processor 1380, precoded by a TX MIMO processor 1382 if applicable, further processed by modulators 1354a through 1354r, and transmitted to base station 110. At base station 110, the uplink signals from UE 120 may be received by antennas 1334, processed by demodulators 1332, detected by a MIMO detector 1336 if applicable, and further processed by a receive processor 1338 to recover the data and control information sent by UE 120. Processor 1338 may provide the recovered data to a data sink 1339 and may provide the recovered control information to controller/processor 1340.

Controllers/processors 1340 and 1390 may direct the operation at base station 110 and UE 120, respectively. Processor 1320, processor 1340, and/or other processors and modules at base station 110 may perform or direct process 1200 in FIG. 12 and/or other processes for the techniques described herein. Processor 1370, processor 1390, and/or other processors and modules at UE 120 may perform or direct process 1100 in FIG. 11 and/or other processes for the techniques described herein. Memories 1342 and 1392 may store data and program codes for base station 110 and UE 120, respectively. A scheduler 1344 may schedule UE 120 and/or other UEs for data transmission on the downlink and/or uplink. Processor 1320, processor 1340, scheduler 1344, and/or other processors and modules at base station 110 may implement module 900 in FIG. 9. Processor 1370, processor 1390, and/or other processors and modules at UE 120 may implement module 1000 in FIG. 10.

In one configuration, apparatus 120 for wireless communication may include means for determining at least one first DCI format to monitor on a first carrier at a UE, means for monitoring for the at least one first DCI format on the first carrier to detect DCI sent to the UE, means for receiving at the UE a reconfiguration message related to communication on a plurality of carriers by the UE with cross-carrier signaling, means for determining at least one second DCI format to monitor on the first carrier at the UE based on the reconfiguration message, and means for monitoring for the at least one first DCI format and the at least one second DCI format on the first carrier after receiving the reconfiguration message to detect DCI sent to the UE.

In one configuration, apparatus 110 for wireless communication may include means for determining at least one first DCI format monitored by a UE on a first carrier, means for sending DCI on the first carrier to the UE based on the at least one first DCI format, means for sending to the UE a reconfiguration message related to communication on a plurality of carriers by the UE with cross-carrier signaling, means for determining at least one second DCI format monitored by the UE on the first carrier in response to the reconfiguration message, and means for sending DCI on the first carrier to the UE based on the at least one first DCI format and the at least one second DCI format after sending the reconfiguration message.

In an aspect, the aforementioned means may be processor(s) 1320, 1338 and/or 1340 at base station 110 and/or processors(s) 1370, 1380 and/or 1390 at UE 120, which may be configured to perform the functions recited by the aforementioned means. In another aspect, the aforementioned means may be one or more modules or any apparatus configured to perform the functions recited by the aforementioned means.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method of wireless communication, comprising:
    monitoring, at a user equipment (UE), downlink control information (DCI) from a first carrier received by the UE, the monitoring being based on at least one first DCI format;
    receiving, at the UE, a reconfiguration message indicating a transition between downlink control signaling without cross-carrier signaling and downlink control signaling with cross-carrier signaling;
    monitoring for the at least one first DCI format and for at least one second DCI format indicated by the reconfiguration message, after receiving the reconfiguration message, to detect DCI sent to the UE, wherein the monitoring for the at least one first DCI format and the at least one second DCI format comprises:
    decoding a first set of downlink control channel element candidates for the UE on the first carrier for the at least one first DCI format, and
    decoding a second set of downlink control channel element candidates for the UE on a second carrier for the at least one second DCI format.

2. The method of claim 1, wherein each second DCI format comprises a corresponding first DCI format and at least one additional field supporting cross-carrier signaling.

3. The method of claim 2, wherein the at least one additional field comprises a cross-carrier indication field (CIF) indicating a carrier on which a data transmission is scheduled.

4. The method of claim 1, wherein the at least one first DCI format has a first size, and wherein the at least one second DCI format has a second size different from the first size.

5. The method of claim 1, further comprising:
determining a third DCI format to monitor on the first carrier prior to receiving the reconfiguration message, the third DCI format being associated with a transmission mode of the UE on the first carrier;
monitoring for the third DCI format on the first carrier prior to receiving the reconfiguration message to detect DCI sent to the UE;
determining a fourth DCI format to monitor on the first carrier after receiving the reconfiguration message, the fourth DCI format being associated with the transmission mode of the UE on the first carrier; and
monitoring for the fourth DCI format to detect DCI sent to the UE and not monitoring for the third DCI format on the first carrier after receiving the reconfiguration message.

6. The method of claim 1, further comprising:
monitoring for the at least one second DCI format but not the at least one first DCI format on a second carrier after receiving the reconfiguration message.

7. The method of claim 1, further comprising:
monitoring for the at least one first DCI format and the at least one second DCI format on a subset of a plurality of carriers after receiving the reconfiguration message, the subset of the plurality of carriers including the first carrier; and
monitoring for the at least one second DCI format and not monitoring for the at least one first DCI format on remaining ones of the plurality of carriers after receiving the reconfiguration message.

8. The method of claim 1, wherein the monitoring for the at least one first DCI format and the at least one second DCI format comprises monitoring for the at least one second DCI format in all search spaces for the UE on the first carrier.

9. The method of claim 1, wherein the monitoring for the at least one first DCI format and the at least one second DCI format comprises monitoring for the at least one second DCI format in a UE-specific search space and not monitoring for the at least one second DCI format in a common search space of the UE on the first carrier.

10. The method of claim 1, wherein the first and second sets of downlink control channel element candidates comprise first and second sets of Physical Downlink Control Channel (PDCCH) candidates.

11. The method of claim 1, wherein the first set of downlink control channel element candidates is for a common search space on the first carrier, and wherein the second set of downlink control channel element candidates is for a UE-specific search space on the second carrier.

12. The method of claim 1, further comprising:
determining a third DCI format to monitor on the first carrier prior to receiving the reconfiguration message, the third DCI format being associated with a transmission mode of the UE on the first carrier;
monitoring for the third DCI format on the first carrier prior to receiving the reconfiguration message to detect DCI sent to the UE; and
monitoring for the at least one first DCI format and the at least one second DCI format, and not monitoring for the third DCI format, on the first carrier during a transition interval for reconfiguration of the UE based on the reconfiguration message.

13. The method of claim 12, further comprising:
determining a start of the transition interval based on a time at which the reconfiguration message is received by the UE.

14. The method of claim 12, further comprising:
sending a reconfiguration complete message by the UE;
receiving an acknowledgement for the reconfiguration complete message; and
determining an end of the transition interval based on a time at which the reconfiguration complete message is sent by the UE or a time at which the acknowledgement for the reconfiguration complete message is received by the UE.

15. The method of claim 14, wherein the determining the end of the transition interval comprises determining the end of the transition interval based further on a timer, wherein the timer is started at the time at which the reconfiguration complete message is sent or at the time at which the acknowledgement for the reconfiguration complete message is received.

16. The method of claim 1, further comprising:
receiving data on a single carrier by the UE prior to receiving the reconfiguration message; and
receiving data on a plurality of carriers with cross-carrier signaling by the UE after receiving the reconfiguration message.

17. The method of claim 1, further comprising:
receiving data on a plurality of carriers without cross-carrier signaling by the UE prior to receiving the reconfiguration message; and
receiving data on the plurality of carriers with cross-carrier signaling by the UE after receiving the reconfiguration message.

18. The method of claim 1, wherein the at least one first DCI format includes DCI format 1A for downlink grants, or DCI format 0 for uplink grants, or both.

19. The method of claim 1, wherein the at least one second DCI format includes DCI format 1A' comprising DCI format 1A and a cross-carrier indication field (CIF), or DCI format 0' comprising DCI format 0 and the CIF, or both.

20. The method of claim 1, wherein the at least one first DCI format and the at least one second DCI format are of different sizes.

21. An apparatus for wireless communication, comprising:
means for monitoring, at a user equipment (UE), downlink control information (DCI) from a first carrier received by the UE, the monitoring being based on at least one first DCI format;
means for receiving, at the UE, a reconfiguration message indicating a transition between downlink control signaling without cross-carrier signaling and downlink control signaling with cross-carrier signaling; and
means for monitoring for the at least one first DCI format and for at least one second DCI format indicated by the reconfiguration message, after receiving the reconfiguration message, to detect DCI sent to the UE, wherein the means for monitoring for the at least one first DCI format and the at least one second DCI format comprises:
means for decoding a first set of downlink control channel element candidates on the first carrier for the at least one first DCI format, and
means for decoding a second set of downlink control channel element candidates on a second carrier for the at least one second DCI format.

22. The apparatus of claim 21, further comprising:
means for monitoring for the at least one first DCI format and the at least one second DCI format on a subset of a plurality of carriers after receiving the reconfiguration message, the subset of the plurality of carriers including the first carrier; and
means for monitoring for the at least one second DCI format but not the at least one first DCI format on remaining ones of the plurality of carriers after receiving the reconfiguration message.

23. The apparatus of claim 21, wherein the means for monitoring for the at least one first DCI format and the at least one second DCI format comprises means for monitoring for the at least one second DCI format in a UE-specific search space but not a common search space for the UE on the first carrier.

24. The apparatus of claim 21, wherein the at least one first DCI format and the at least one second DCI format are of different sizes.

25. An apparatus for wireless communication, comprising:
at least one processor of a user equipment (UE) configured to:
monitor downlink control information (DCI) from a first carrier received by the UE, based on at least one first DCI format,
receive, at the UE, a reconfiguration message indicating a transition between downlink control signaling without cross-carrier signaling and downlink control signaling with cross-carrier signaling, and
monitor for the at least one first DCI format and for at least one second DCI format indicated by the reconfiguration message, after receiving the reconfiguration message, to detect DCI sent to the UE; and
a memory coupled to the at least one processor,
wherein the at least one processor is further configured to decode a first set of downlink control channel element candidates on the first carrier for the at least one first DCI format, and to decode a second set of downlink control channel element candidates on a second carrier for the at least one second DCI format.

26. The apparatus of claim 25, wherein the at least one processor is configured to monitor for the at least one first DCI format and the at least one second DCI format on a subset of a plurality of carriers after receiving the reconfiguration message, the subset of the plurality of carriers including the first carrier, and to monitor for the at least one second DCI format but not the at least one first DCI format on remaining ones of the plurality of carriers after receiving the reconfiguration message.

27. The apparatus of claim 25, wherein the at least one processor is configured to monitor for the at least one second DCI format in a UE-specific search space but not a common search space for the UE on the first carrier.

28. The apparatus of claim 25, wherein the at least one first DCI format and the at least one second DCI format are of different sizes.

29. A computer program product, comprising:
a non-transitory computer-readable medium comprising:
code for causing at least one computer of a user equipment (UE) to monitor downlink control information (DCI) from a first carrier received by the UE, based on at least one first DCI format,
code for causing the at least one computer to receive at the UE a reconfiguration message indicating a transition between downlink control signaling without cross-carrier signaling and downlink control signaling with cross-carrier signaling,
code for causing the at least one computer of the UE to monitor for the at least one first DCI format and for at least one second DCI format indicated by the reconfiguration message, after receiving the reconfiguration message, to detect DCI sent to the UE, wherein the code for causing the at least one computer of the UE to monitor for the at least one first DCI format and the at least one second DCI format comprises:
code for causing the at least one computer of the UE to decode a first set of downlink control channel element candidates on the first carrier for the at least one first DCI format, and
code for causing the at least one computer of the UE to decode a second set of downlink control channel element candidates on the second carrier for the at least one second DCI format.

30. A method of wireless communication, comprising:
sending downlink control information (DCI) on a first carrier to a user equipment (UE), the sending being based on at least one first DCI format;
sending to the UE a reconfiguration message indicating a transition between downlink control signaling without cross-carrier signaling and downlink control signaling with cross-carrier signaling; and
sending DCI on the first carrier and on a second carrier to the UE, based on the at least one first DCI format and at least one second DCI format, after sending the reconfiguration message, wherein the sending DCI on the first carrier and on the second carrier to the UE based on the at least one first DCI format and the at least one second DCI format comprises:
sending DCI based on the at least one first DCI format in a first set of downlink control channel elements for the UE on the first carrier, and
sending DCI based on the at least one second DCI format in a second set of downlink control channel elements for the UE on the second carrier.

31. The method of claim 30, further comprising:
determining a third DCI format monitored by the UE on the first carrier prior to sending the reconfiguration message, the third DCI format being associated with a transmission mode of the UE on the first carrier;
sending DCI on the first carrier to the UE based further on the third DCI format prior to sending the reconfiguration message;
determining a fourth DCI format monitored by the UE on the first carrier after sending the reconfiguration message, the fourth DCI format being associated with the transmission mode of the UE on the first carrier; and
sending DCI on the first carrier to the UE based further on the fourth DCI format but not the third DCI format after sending the reconfiguration message.

32. The method of claim 30, further comprising:
sending DCI to the UE on the second carrier based on the at least one second DCI format but not the at least one first DCI format after sending the reconfiguration message.

33. The method of claim 30, further comprising:
sending DCI to the UE based on the at least one first DCI format and the at least one second DCI format on a subset of a plurality of carriers after sending the reconfiguration message;
and
sending DCI to the UE based on the at least one second DCI format but not the at least one first DCI format on remaining ones of the plurality of carriers after sending the reconfiguration message.

34. The method of claim 30, wherein the sending DCI on the first carrier to the UE based on the at least one first DCI format and the at least one second DCI format comprises sending DCI to the UE based on the at least one second DCI format in a UE-specific search space but not a common search space on the first carrier.

35. The method of claim 30, wherein the downlink control channel elements sent in the at least one first DCI format on the first carrier are sent in a common search space on the first carrier, and wherein the downlink control channel elements sent in the at least one second DCI format on the second carrier are sent in a UE-specific search space for the UE on the second carrier.

36. The method of claim 30, wherein the first and second sets of downlink control channel element candidates correspond to different parts of an aggregation level for a search space for the UE.

37. The method of claim 30, further comprising:
sending data on a single carrier to the UE prior to sending the reconfiguration message; and
sending data on a plurality of carriers with cross-carrier signaling to the UE after sending the reconfiguration message.

38. The method of claim 30, further comprising:
sending data on a plurality of carriers without cross-carrier signaling to the UE prior to sending the reconfiguration message; and
sending data on the plurality of carriers with cross-carrier signaling to the UE after sending the reconfiguration message.

39. The method of claim 30, wherein the at least one first DCI format includes DCI format 1A for downlink grants, or DCI format 0 for uplink grants, or both.

40. The method of claim 39, wherein the at least one second DCI format includes DCI format 1A' comprising DCI format 1A and a cross-carrier indicator field (CIF), or DCI format 0' comprising DCI format 0 and the CIF, or both.

41. The method of claim 39, further comprising:
generating a first grant for a data transmission to the UE based on one of the at least one first DCI format;
generating a second grant for the data transmission to the UE based on one of the at least one second DCI format; and
sending the first and second grants to the UE.

42. The method of claim 30, wherein the at least one first DCI format and the at least one second DCI format are of different sizes.

43. An apparatus for wireless communication, comprising:
means for sending downlink control information (DCI) on a first carrier to a user equipment (UE) based on at least one first DCI format;
means for sending to the UE a reconfiguration message indicating a transition between downlink control signaling without cross-carrier signaling and downlink control signaling with cross-carrier signaling;
means for sending to the UE, after sending the reconfiguration message, DCI on the first carrier based on the at least one first DCI format and on a second carrier based on at least one second DCI format, wherein the means for sending DCI on the first carrier to the UE based on the at least one first DCI format and on the second carrier based on the at least one second DCI format comprises:
means for sending DCI based on the at least one first DCI format in a first set of downlink control channel elements for the UE on the first carrier, and
means for sending DCI based on the at least one second DCI format in a second set of downlink control channel elements for the UE on the second carrier.

44. The apparatus of claim 43, further comprising:
means for sending DCI to the UE based on the at least one first DCI format and the at least one second DCI format on a subset of a plurality of carriers after sending the reconfiguration message; and
means for sending DCI to the UE based on the at least one second DCI format but not the at least one first DCI format on remaining ones of the plurality of carriers after sending the reconfiguration message.

45. The apparatus of claim 43, wherein the means for sending DCI on the first carrier to the UE based on the at least one first DCI format and the at least one second DCI format comprises means for sending DCI to the UE based on the at least one second DCI format in a UE-specific search space but not a common search space on the first carrier.

46. The apparatus of claim , wherein the at least one first DCI format and the at least one second DCI format are of different sizes.

47. An apparatus for wireless communication, comprising:
at least one processor configured to:
send downlink control information (DCI) on a first carrier to a user equipment (UE), based on at least one first DCI format,
send to the UE a reconfiguration message indicating a transition between downlink control signaling without cross-carrier signaling and downlink control signaling with cross-carrier signaling, and
send to the UE, after sending the reconfiguration message, DCI on the first carrier based on the at least one first DCI format and on at least one second carrier based on at least one second DCI format, the sending including sending a first set of downlink control channel elements of the first carrier based on the at least one first DCI format and sending a second set of downlink control channel elements of the second carrier based on the at least one second DCI format; and
a memory coupled to the at least one processor.

48. The apparatus of claim 47, wherein the at least one first DCI format and the at least one second DCI format are of different sizes.

49. A computer program product, comprising:
a non-transitory computer-readable medium comprising:
code for causing the at least one computer to send downlink control information (DCI) on a first carrier to a user equipment (UE), based on at least one first DCI format, code for causing the at least one computer to send to the UE a reconfiguration message indicating a transition between downlink control signaling without cross-carrier signaling and downlink control signaling with cross-carrier signaling, and
code for causing the at least one computer to send to the UE, after sending the reconfiguration message, DCI on the first carrier based on the at least one first DCI format and on at least one second carrier based on at least one second DCI format, the sending including sending a first set of downlink control channel elements of the first carrier based on the at least one first DCI format and sending a second set of downlink control channel elements of the second carrier based on the at least one second DCI format.

* * * * *